United States Patent
Hayama et al.

(10) Patent No.: US 9,690,677 B2
(45) Date of Patent: Jun. 27, 2017

(54) TRANSMISSION DEVICE, TRANSMISSION SYSTEM, AND TRANSMISSION METHOD

(71) Applicant: FUJITSU LIMITED, Kawasaki-shi, Kanagawa (JP)

(72) Inventors: Yutaka Hayama, Sano (JP); Nobuyuki Fukuchi, Oyama (JP); Kouji Kurihara, Ashikaga (JP); Tsutomu Chikazawa, Utsunomiya (JP); Yasushi Tateno, Moka (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/976,697

(22) Filed: Dec. 21, 2015

(65) Prior Publication Data

US 2016/0203063 A1    Jul. 14, 2016

(30) Foreign Application Priority Data

Jan. 14, 2015 (JP) .................. 2015-005218

(51) Int. Cl.
*H04L 1/00* (2006.01)
*G06F 11/20* (2006.01)
*H04L 1/22* (2006.01)

(52) U.S. Cl.
CPC ........ *G06F 11/2007* (2013.01); *H04L 1/0041* (2013.01); *H04L 1/0061* (2013.01); *H04L 1/22* (2013.01); *G06F 2201/805* (2013.01); *G06F 2201/85* (2013.01)

(58) Field of Classification Search
CPC .......... G06F 11/2007; G06F 2201/805; G06F 2201/85; H04L 1/22; H04L 1/0061; H04L 1/0041
See application file for complete search history.

(56) References Cited

U.S. PATENT DOCUMENTS

| | | | |
|---|---|---|---|
| 6,977,885 B1 | 12/2005 | Watanuki et al. | |
| 2002/0141340 A1* | 10/2002 | Tamura | H04L 41/064 370/231 |
| 2010/0284397 A1* | 11/2010 | Poulin | H04L 12/66 370/352 |
| 2012/0008507 A1* | 1/2012 | Kano | H04L 12/4641 370/242 |
| 2012/0140776 A1* | 6/2012 | Hirota | H04J 3/1617 370/465 |
| 2012/0201123 A1* | 8/2012 | Pegrum | H04L 12/4641 370/218 |
| 2014/0372840 A1* | 12/2014 | Barthel | H04L 1/0061 714/807 |

FOREIGN PATENT DOCUMENTS

| | | |
|---|---|---|
| JP | 2001-069191 | 3/2001 |
| WO | 2006-001060 | 1/2006 |

* cited by examiner

*Primary Examiner* — Clemence Han
(74) *Attorney, Agent, or Firm* — Fujitsu Patent Center

(57) ABSTRACT

A first transmission device transmits a signal to a third transmission device by using an active line and a spare line. The first transmission device includes a CRC generator and an SN adder. The CRC generator calculates the CRC value of the signal. The SN adder stores, in a FCS byte filed in the signal, the FCS calculated value obtained by adding the SN representing consecutiveness of the signal to the CRC value. Furthermore, the first transmission device outputs the signal in which the FCS calculated value is stored to the second transmission device by using the active line and the spare line.

9 Claims, 24 Drawing Sheets

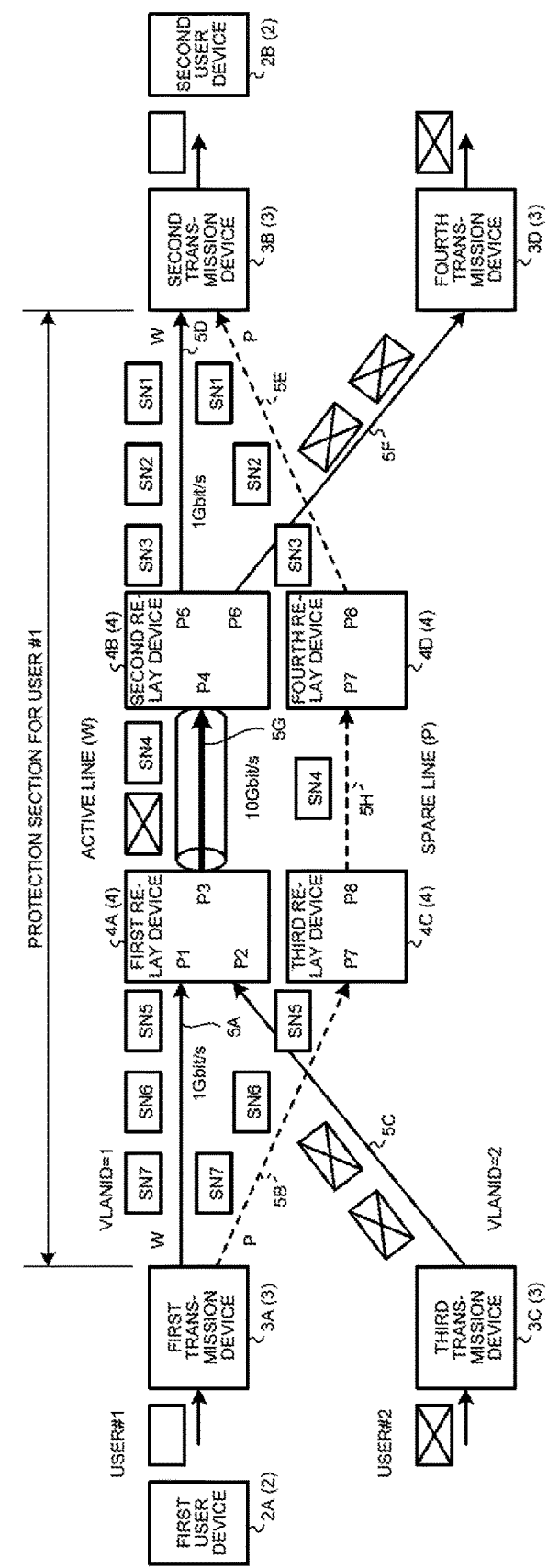

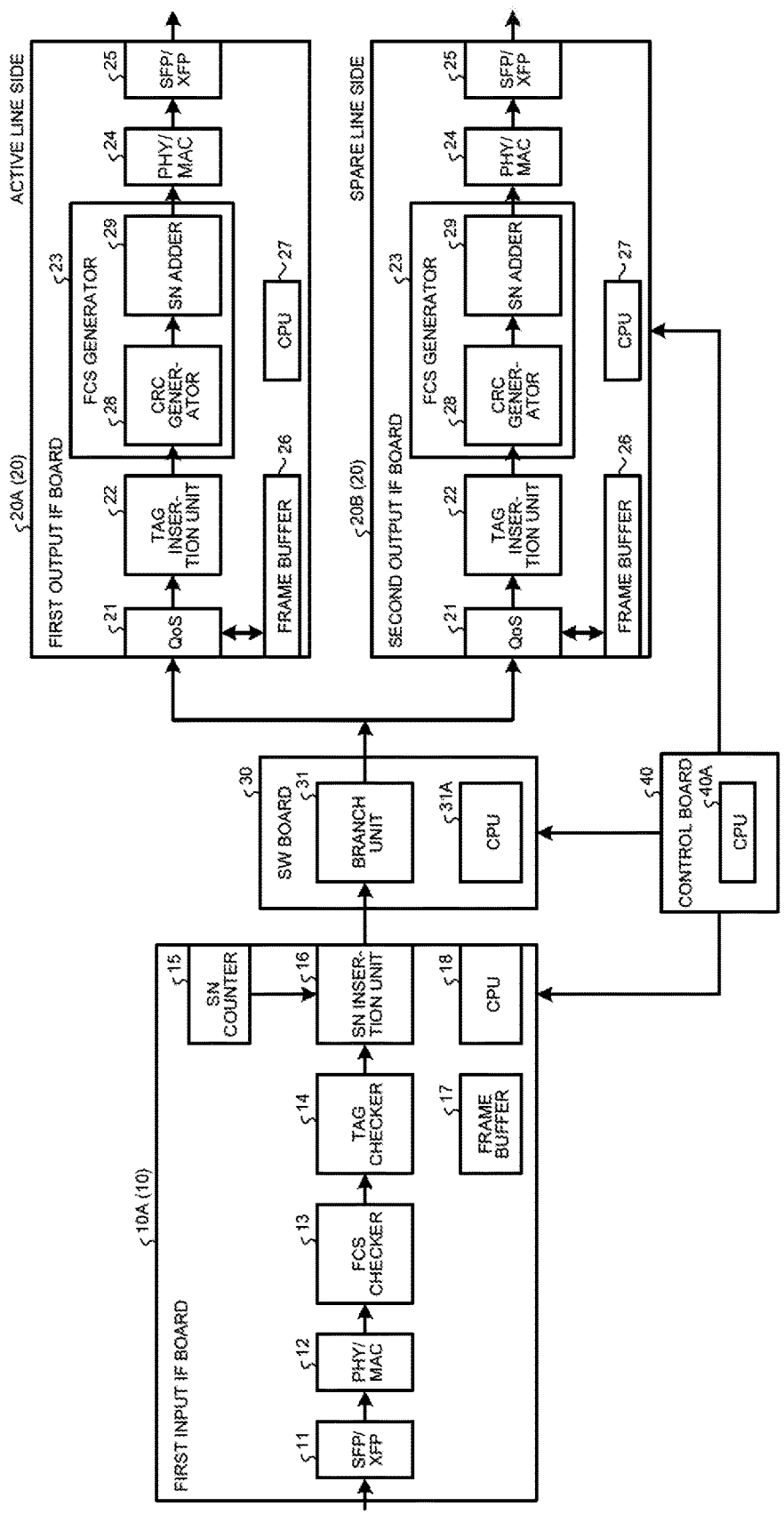

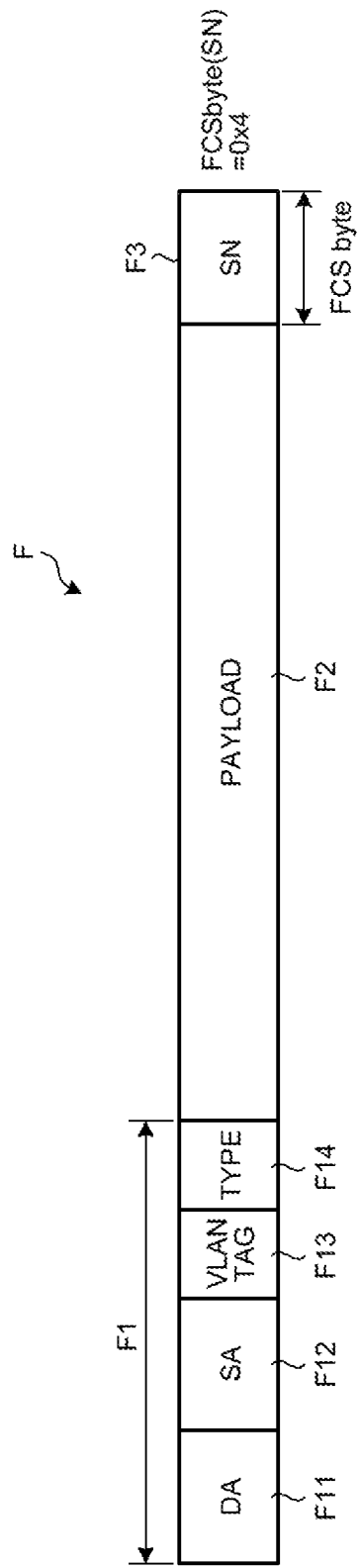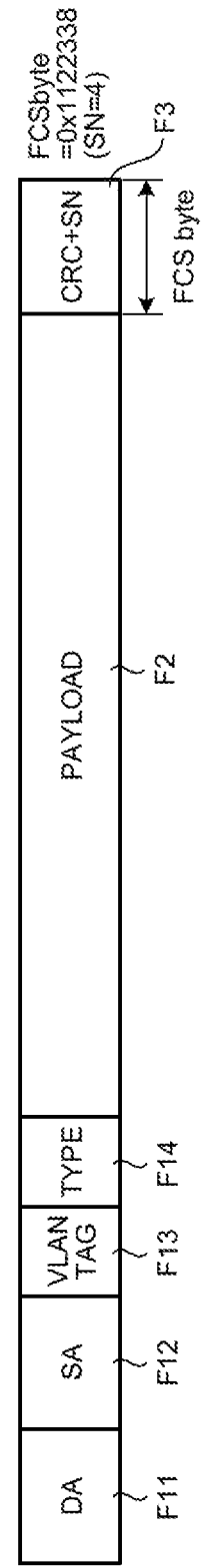

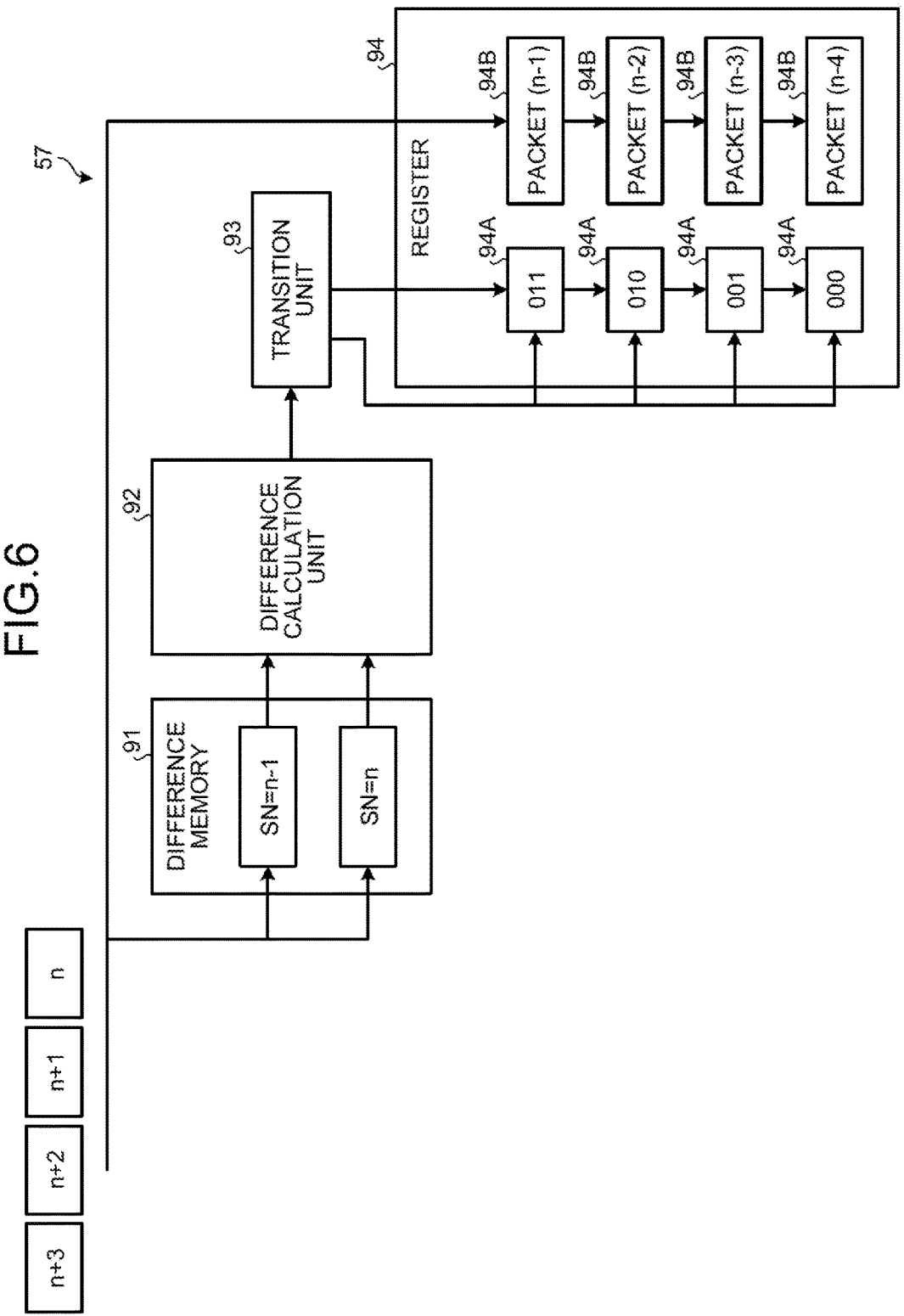

FIG.7A

| SN | ... | 14 | 13 | 12 | 11 | 10 | 23 | 8 | 7 | ... |
|---|---|---|---|---|---|---|---|---|---|---|
| DIFFERENCE VALUE | ... | +1 | +1 | +1 | +1 | -13 | +15 | +1 | +1 | ... |
| STATUS | ... | 100 | 011 | 010 | 001 | 000 | 000 | 100 | 100 | ... |

FIG.7B

| SN | ... | 13 | 12 | 11 | 10 | 23 |
|---|---|---|---|---|---|---|
| STATUS BEFORE DETECTION OF SYNCHRONIZATION ESTABLISHMENT SIGNAL | ... | 011 | 010 | 001 | 000 | 000 |
| STATUS AFTER DETECTION OF SYNCHRONIZATION ESTABLISHMENT SIGNAL | ... | 100 | 100 | 100 | 100 | |

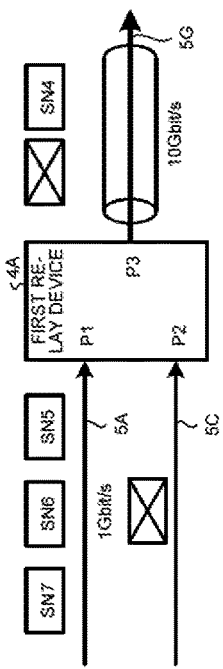
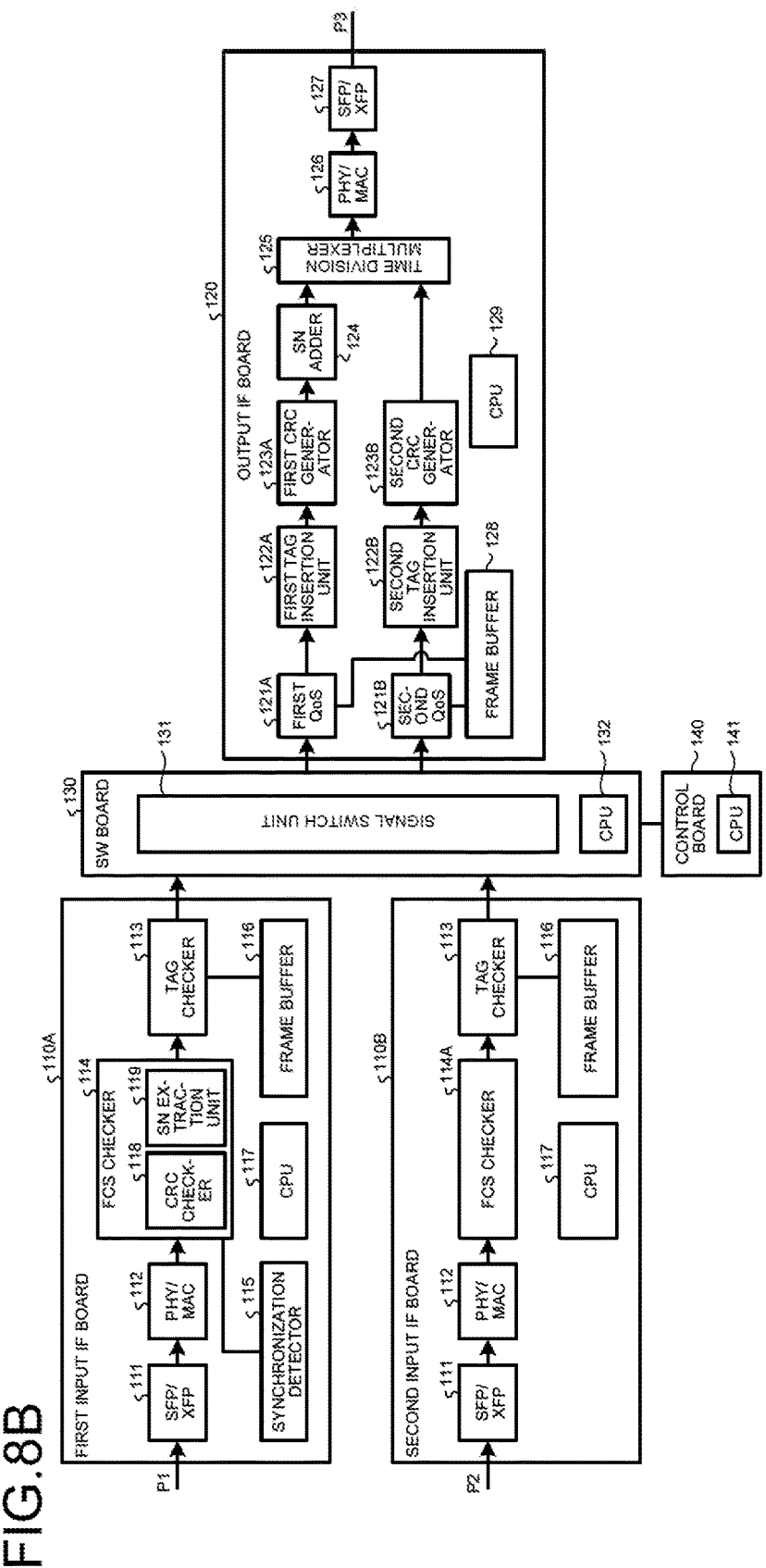
FIG.8A
FIG.8B

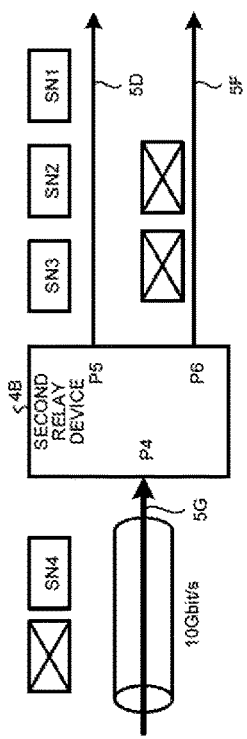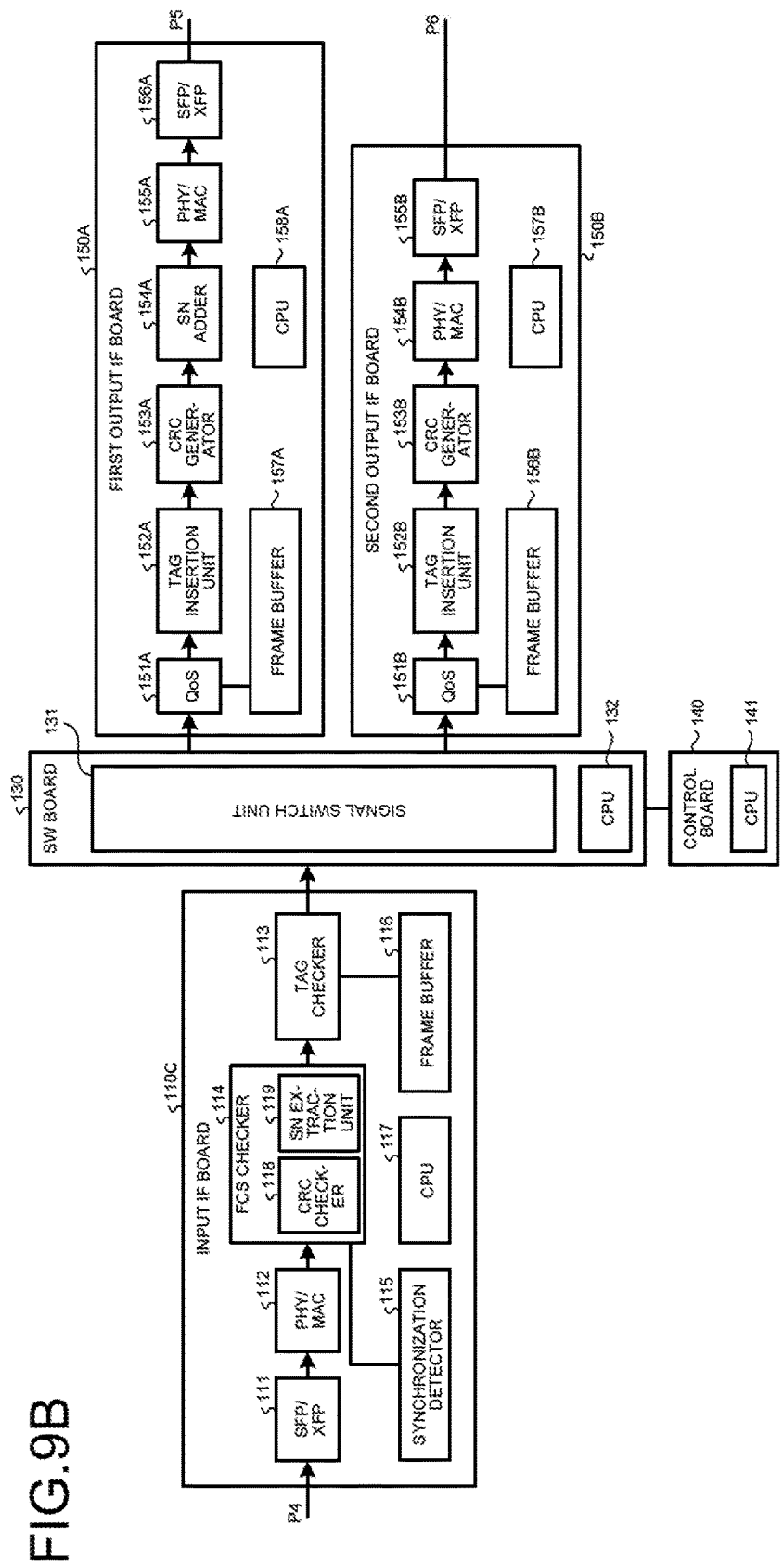
FIG.9A
FIG.9B

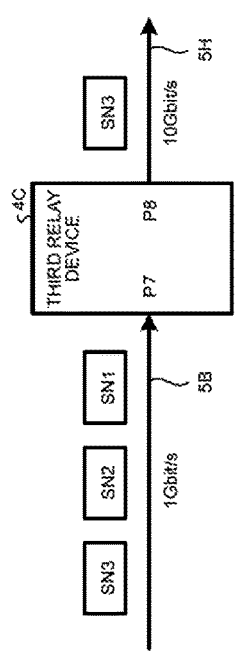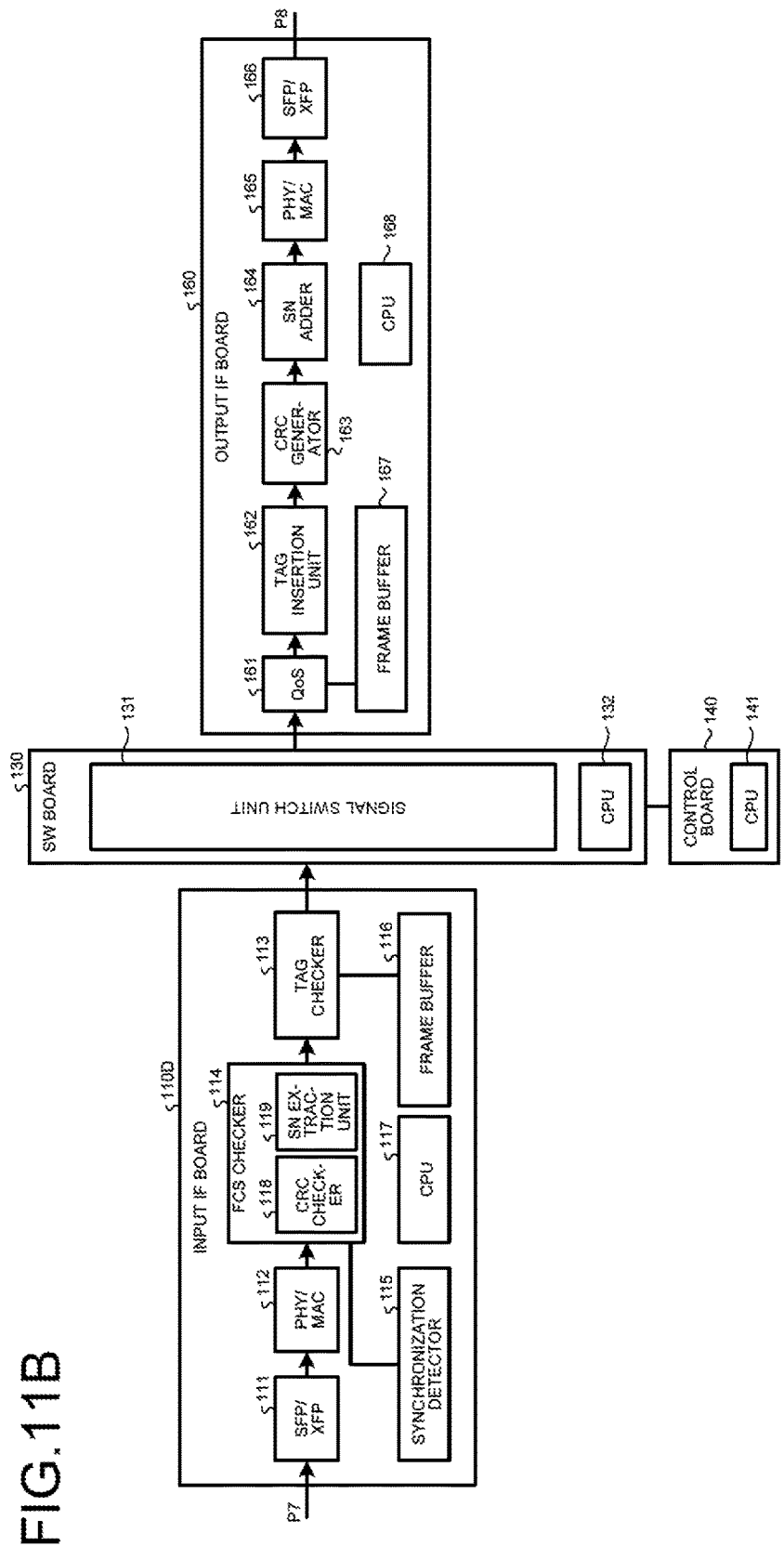
FIG.11A
FIG.11B

TRANSMISSION DEVICE, TRANSMISSION SYSTEM, AND TRANSMISSION METHOD

CROSS-REFERENCE TO RELATED APPLICATION

This application is based upon and claims the benefit of priority of the prior Japanese Patent Application No. 2015-005218, filed on Jan. 14, 2015, the entire contents of which are incorporated herein by reference.

FIELD

The embodiment discussed herein is directed to a transmission device, a transmission system, and a transmission method.

BACKGROUND

For transmission systems for synchronous communications, for example, technologies have been known for connecting transmission devices by a redundant configuration using an active line and a spare line and, when a failure occurs in the active line, making a connection to the spare line by uninterruptible switching from the active line to the spare line. Furthermore, in recent years, also for transmission systems for asynchronous communications, there has been a demand for technologies for making a connection to a spare line by uninterruptible switching from an active line to the spare line. Transmission systems for asynchronous communications need a system for phasing the signal received by the active line and the signal received by the spare line.

There is therefore a method of transmitting a signal attached with a sequential number (SN) in a protection section between transmission devices in order to measure the signal delay difference (phase difference) between an active line and a spare line between the transmission devices in a transmission system by using the same signal. In this case, a method of storing an SN in a payload filed in a signal is employed as a method of attaching an SN to a signal. Accordingly, the transmission device refers to the SN in the signal from the active line and the SN in the signal from the spare line and absorbs the delay difference by phasing the signals in accordance with the phase difference between the signals from the active line and the spare line having the same SN.

International Publication Pamphlet No. WO 2006/001060

A transmission device has to secure a payload filed in a signal into which a SN is inserted and then transmit the signal to an opposing device; however, when there is no free space in the payload filed in the signal, e.g., when the traffic of approximately 100% is input and then the SN is inserted into the signal, a line overflow occurs and thus a signal loss occurs.

SUMMARY

According to an aspect of the embodiments, a transmission device transmits a signal to an opposing device by using an active line and a spare line. The transmission device includes a calculation unit, a storage control unit and an output unit. The calculation unit calculates an error code value of the signal. The storage control unit identifies the signal per signal and stores, in a predetermined field in the signal, a calculated value obtained by adding a sequential number that represents consecutiveness of the signal to the error code value. The output unit outputs the signal in which the calculated value is stored to the opposing device by using the active line and the spare line.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is an explanatory view illustrating an exemplary transmission system according to an embodiment;

FIG. 2 is an explanatory view illustrating an exemplary configuration of a sending unit in a first transmission device;

FIGS. 3A and 3B are explanatory views illustrating exemplary internal frame configurations of a signal;

FIG. 6 is an explanatory view illustrating an exemplary internal configuration of the synchronization detector;

FIGS. 7A and 7B are explanatory views illustrating the relationship between the SN, difference value, and status determined by the synchronization detector;

FIGS. 8A and 8B are explanatory views illustrating an exemplary internal configuration of a first relay device;

FIGS. 9A and 9B are explanatory views illustrating an exemplary internal configuration of a second relay device;

FIGS. 11A and 11B are explanatory views illustrating an exemplary internal configuration of a third relay device;

DESCRIPTION OF EMBODIMENTS

Figure 4A:
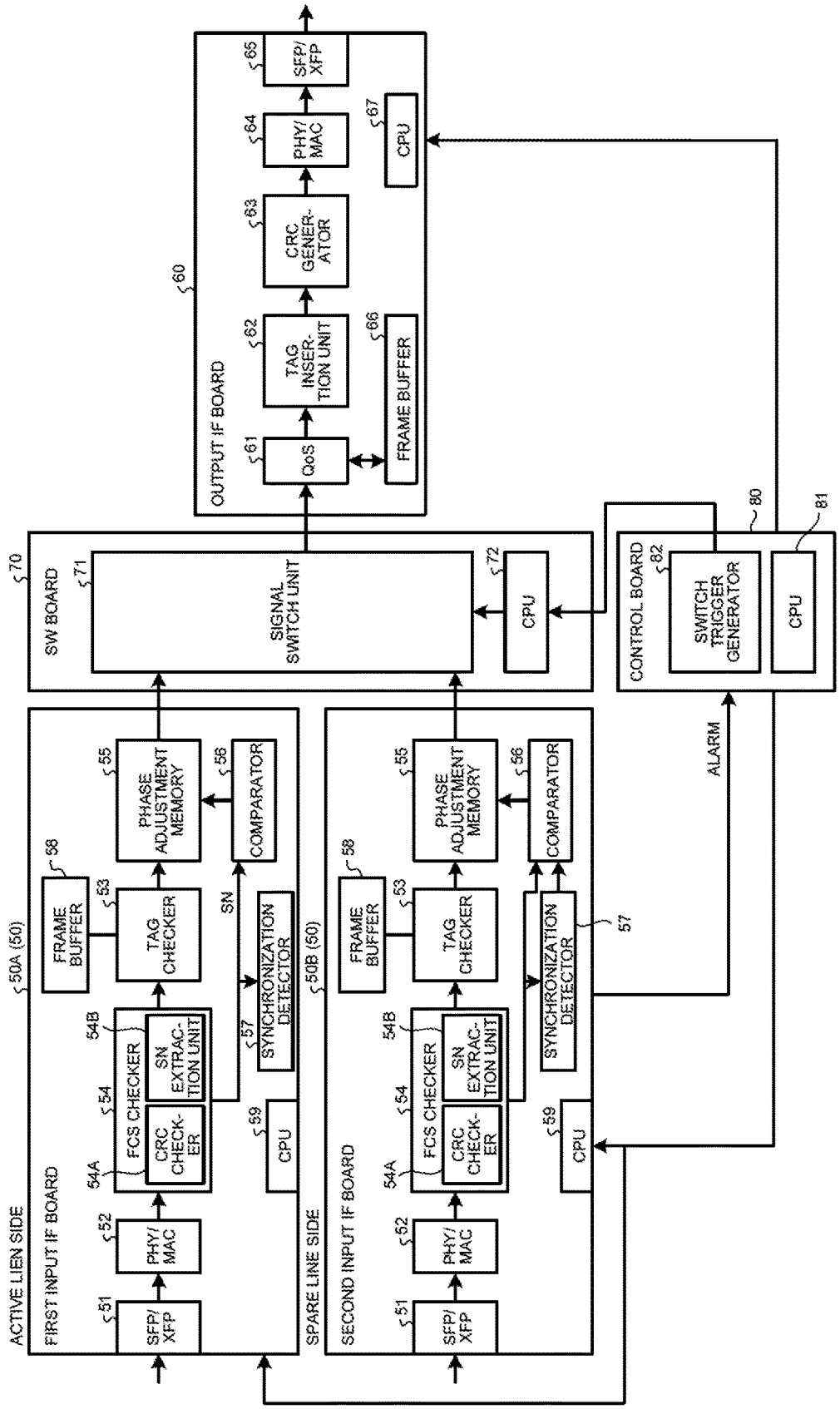
FIG. 4A is an explanatory view illustrating an exemplary configuration of a receiver in a second transmission device.

Preferred embodiments of the present invention will be explained with reference to accompanying drawings. Note that the embodiments do not limit the disclosed technology. The embodiments described below may be combined within a range without any contradiction.

FIG. 1 is an explanatory view illustrating an exemplary transmission system according to an embodiment. A transmission system 1 illustrated in FIG. 1 includes, for example, two user devices 2, four transmission devices 3, and four relay devices 4. The user devices 2 include a first user device 2A and a second user device 2B. The transmission devices 3 include a first transmission device 3A, a second transmission device 3B, a third transmission device 3C, and a fourth transmission device 3D. The relay devices 4 include a first relay device 4A, a second relay device 4B, a third relay device 4C, and a fourth relay device 4D.

The first user device 2A communicates data with the opposing second user device 2B via the transmission device 3 and the relay device 4. The first transmission device 3A, for example, connects to the first relay device 4A via a first line 5A. The first transmission device 3A, for example, connects to the third relay device 4C via a second line 5B. The third transmission device 3C connects to the first relay device 4A via a third line 5C. The first line 5A, the second line 5B, and the third line 5C are, for example, optical lines having a transmission capacity of 1 Gbit/sec.

The second transmission device 3B, for example, connects to the second relay device 4B via a fourth line 5D. The second transmission device 3B, for example, connects to the fourth relay device 4D via a fifth line 5E. The fourth transmission device 3D, for example, connects to the second relay device 4B via a sixth line 5F. The fourth line 5D, the fifth line 5E, and the sixth line 5F are, for example, optical lines having a transmission capacity of 1 Gbit/sec.

The first relay device 4A, for example, connects to the second relay device via a seventh line 5G. The third relay device 4C connects to the fourth relay device 4D via an eighth line 5H. The seventh line 5G and the eighth line 5H are, for example, optical lines having a transmission capacity of 10 Gbit/sec.

The first transmission device 3A makes a connection by using the first line 5A between the first transmission device 3A and the first relay device 4A as the active line and makes a connection by using the second line 5B between the first transmission device 3A and the third relay device 4C as the spare line. The second transmission device 3B makes a connection by using the fourth line 5D between the second transmission device 3B and the second relay device 4B as the active line and makes a connection by using the fifth line 5E between the second transmission device 3B and the fourth relay device 4D as the spare line. In short, the first transmission device 3A connects to the second transmission device 3B via the first line 5A, the first relay device 4A, the seventh line 5G, the second relay device 4B, the fourth line 5D, each serving as the active line, sequentially. Furthermore, the first transmission device 3A connects to the second transmission device 3B via the second line 5B, the third relay device 4C, the eighth line 5H, the fourth relay device 4D, and the fifth line 5E, each serving as the spare line, sequentially. The first transmission device 3A transmits a signal having a virtual local area network (VLAN) ID of "1" of User #1 to the second transmission device 3B. The third transmission device 3C transmits a signal having a VLAN ID of "2" of User #2 to the fourth transmission device 3D. In other words, the seventh line 5G is shared by the VLAN IDs "1" and "2".

FIG. 2 is an explanatory view illustrating an exemplary configuration of a sending unit in the first transmission device 3A. While the first transmission device 3A will be exemplified and described for convenience of descriptions, because the second transmission device 3B has the same configuration as that of the first transmission device 3A, the same components are denoted by the same reference numerals and the redundant descriptions of the components and operations will be omitted.

The first transmission device 3A illustrated in FIG. 3A includes one input interface (IF) board 10, an output IF board 20, an SW board 30, and a control board 40. The input IF board 10 is, for example, an input interface that connects to the line on the side of the first user device 2A. The output IF board 20 includes a first output IF board 20A and a second output IF board 20B. The first output IF board 20A is, for example, an output interface that connects to the first line 5A on the side of the first relay device 4A. The second output IF board 20B is, for example, an output interface that connects to the second line 5B on the side of the third relay device 4C. The SW board 30 is a switch that performs a switch output to output the output signal from the input IF board 10 to the first output IF board 20A or the second output IF board 20B. The control board 40 controls the whole sending unit in the first transmission device 3A.

The input IF board 10 includes a small form-factor pluggable (SFP)/10G form-factor pluggable (XFP) 11, a physical layer (PHY)/media access control (MAC) 12, a FCS checker 13, and a tag checker 14. The input IF board 10 includes a sequential number (SN) counter 15, an SN insertion unit 16, a frame buffer 17, and a central processing unit (CPU) 18. The SFP/XFP 11 includes, for example, a photoelectric converter that converts an optical signal from a line into an electric signal. The PHY/MAC 12 executes a process matching the physical layer on the signal and executes various processes relating to the MAC layer on the signal.

FIGS. 3A and 3B are explanatory views illustrating an exemplary frame configuration in a signal. FIG. 3A is an explanatory view illustrating an exemplary frame configuration of an output frame from the input IF board 10, and FIG. 3B is an explanatory view illustrating an exemplary frame configuration of an output frame from the output IF board 20.

The frame F depicted in FIG. 3A includes a header field F1, a payload filed F2, and a FCS byte field F3. The header field F1 is a field for storing header information, such as a destination address (DA) F11, a source address (SA) F12, a VLAN tag F13, and a type F14. The DA is an address representing the destination to which the signal is sent. The SA is an address representing the source from which the signal is sent. The VLAN tag F13 is a tag that identifies the VLAN ID. The type F14 represents the type of the frame. The payload filed F2 is an area for storing the data. The FCS byte field F3 is a predetermined area of normally four bytes for storing a CRC calculated value representing the accuracy of the frame. At the output stage of the input IF board 10, the SN with which the frame consecutiveness stored in the FCS byte field F3 is determined is stored.

The frame F illustrated in FIG. 3B is a frame at the output stage of the output IF board 20 and has configuration continents approximately the same as those of the frame F illustrated in FIG. 3A but is different from the frame F illustrated in FIG. 3A in that the information stored in the FCS byte field F3 is the value obtained by adding the sequential number (SN) to the FCS calculated value.

The tag checker 14 refers to the VLAN tag F13 in the frame and, when the VLAN ID of the referred VLAN tag matches, transmits the frame and, when the VLAN ID does not match, discards the frame. The SN counter 15 generates a sequential number (SN) given to the frame. The SN insertion unit 16 inserts the SN into the FCS byte field in the frame. The frame buffer 17 is a field for storing received frames sequentially.

The first output IF board 20A, for example, corresponds to an interface that connects to the first relay device 4A connected as the active line. The second output IF board 20B, for example, corresponds to an interface that connects to the third relay device 4C connected as the spare line.

The first output IF board 20A includes a quality of service (QoS) 21, a tag insertion unit 22, a frame check sequence (FCS) generator 23, a PHY/MAC 24, a SFP/XFP 25, a frame buffer 26, and a CPU 27. The QoS 21 is a processor that controls the traffic of the output signal from the SW board 30. The tag insertion unit 22 is a processor that replaces the VLAN tag in the frame in the signal. The FCS generator 23 includes a cycle redundancy check (CRC) generator 28 and an SN adder 29. The CRC generator 28 is a calculation unit that generates the CRC calculated value from the field value in the frame in the signal. The SN adder 29 adds the SN stored in the FCS byte field to the CRC calculated value to calculate the FCS calculated value. Furthermore, the SN adder 29 stores the calculated FCS calculated value in the FCS byte field. The CPU 27 controls the whole first output IF board 20A. The first output IF board 20A is an output unit that sequentially outputs the signals of frames in each of which the FCS calculated value is stored via the PHY/MAC 24 and the SFP/XFP 25 to the first line 5A, on the side of the first relay device 4A, serving as the active line.

Similarly, the second output IF board 20B includes the QoS 21, the tag insertion unit 22, the FCS generator 23, the PHY/MAC 24, the SFP/XFP 25, the frame buffer 26, and the CPU 27. The CRC generator 28 in the FCS generator 23 of the second output IF board 20B generates a CRC calculated value from the field value in the frame of a signal copied from the SW board 30. The SN adder 29 adds the SN to the CRC calculated value to calculate the FCS calculated value and stores the FCS calculated value in the FCS byte field in the frame. The second output IF board 20B sequentially outputs the signals of frames in wach of which the FCS calculated value is stored via the PHY/MAC 24 and the SFP/XFP 25 to the second line 5B, on the side of the third relay device 4C, serving as the spare line.

The SW board 30 includes a branch unit 31 and a CPU 31A. The branch unit 31 copies the frame of the signal that is input from a first input IF board 10A and outputs the copied frame to the first output IF board 20A and the second output IF board 20B. The CPU 31A controls the whole SW board 30. The control board 40 includes a CPU 40A that controls the whole control board 40 and controls the whole first transmission device 3A.

FIG. 4A is an explanatory view illustrating an exemplary configuration of the receiver in the second transmission device 3B. While the second transmission device 3B will be exemplified and described for convenience of descriptions, because the receiver of the first transmission device 3A has the same configuration as that of the second transmission device 3B, the same components are denoted by the same reference numerals and the redundant descriptions of the components and operations will be omitted.

The second transmission device 3B illustrated in FIG. 4A includes a first input IF board 50A, a second input IF board 50B, an output IF board 60, a SW board 70, and a control board 80. The first input IF board 50A is an input interface that connects to the fifth line 5E on the side of the second relay device 4B, serving as the active line. The second input IF board 50B connects to the fifth line 5E, on the side of the fourth relay device 4D, serving as a spare line. The output IF board 60 is, for example, an output interface that connects to the line on the side of the second user device 2B. The SW board 70 is a switch that performs a switch output to switch the output signal to the output IF board 60 between the output signals from the first input IF board 50A and the second input IF board 50B. The SW board 70 includes a signal switch unit 71 and a CPU 72. The CPU 72 controls the SW board 70. The control board 80 controls the whole receiver in the second transmission device 3B.

The first input IF board 50A includes a SFP/XFP 51, a PHY/MAC 52, a tag checker 53, a FCS checker 54, a phase adjustment memory 55, a comparator 56, a synchronization detector 57, a frame buffer 58, and a CPU 59. The SFP/XFP 51 is a photoelectric converter that performs photoelectric conversion to convert an optical signal from the fourth line 5D on the side of the second relay device 4B to an electric signal. The PHY/MAC 52 executes a process matching the physical layer on the signal and executes various processes relating to the MAC layer on the signal. The FCS checker 54 executes various processes on the basis of the FCS calculated value in the FCS byte field of the frame. The FCS checker 54 includes a CRC checker 54A and an SN extraction unit 54B.

The CRC checker 54A calculates the CRC calculated value from the field value in the frame. Furthermore, the SN extraction unit 54B subtracts the CRC calculated value from the FCS calculated value in the FCS byte field in the frame and extracts the difference value as the SN. The CRC checker 54A discards the frame when the accuracy of the frame is abnormal according to the consecutiveness of the extracted SN. The tag checker 53 refers to the VLAN tag in the frame and, when the VLAN ID of the VLAN tag matches, transmits the frame and, when the VLAN ID does not match, discards the frame.

The synchronization detector 57 is a determination unit that stores the SN extracted per received frame, compares the SN of the previous frame and the SN of the current frame, and determines that the consecutiveness of the previous frame and the current frame is normal when the difference value is +1. The synchronization detector 57 determines that the consecutiveness of the previous frame and the current frame is abnormal when the difference value is other than +1.

Figure 5:
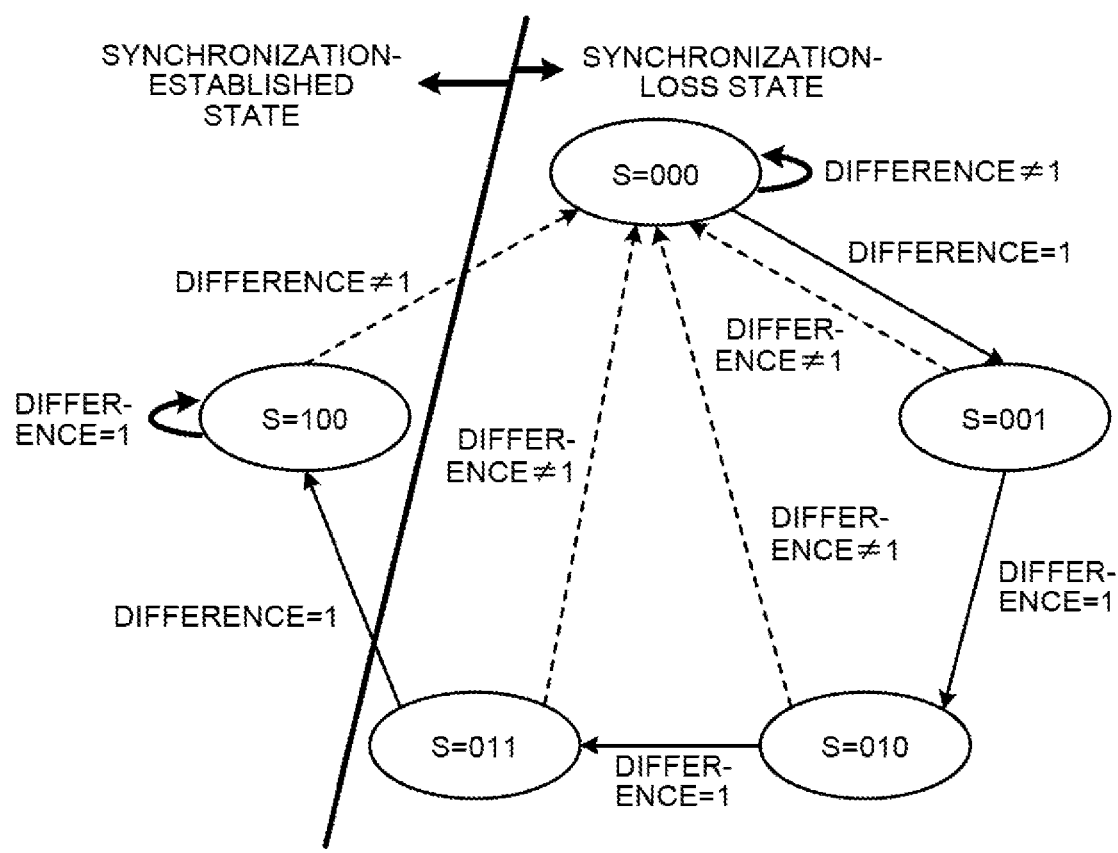
FIG. 5 is an explanatory view illustrating transition of the state of each status determined by a synchronization detector.

FIG. 5 is an explanatory view illustrating transition of the state of each status determined by the synchronization detector 57. The status represented in FIG. 5 represents five types of state by three bits and "100" represents a synchronization-established state, "000", "001", "010" and "011" represent a synchronization-loss state. When the status is "100", the synchronization detector 57 determines that the frame consecutiveness is normal. When the status is "000", the synchronization detector 57 determines that the frame consecutiveness is abnormal.

When the difference value between the previous frame and the current frame is +1 at the next comparison timing in the state where the status is "000", the synchronization detector 57 transitions the status to "001". Furthermore, when the difference value between the previous frame and the current frame is +1 at the next comparison timing in the state where the status is "001", the synchronization detector 57 transitions the status to "010".

Furthermore, when the difference value between the previous frame and the current frame is +1 at the next comparison timing in the state where the status is "010", the synchronization detector 57 transitions the status to "011". Furthermore, when the difference value between the previous frame and the current frame is +1 at the next comparison timing in the state where the status is "011", the synchronization detector 57 transitions the status to "100" and determines that the frame consecutiveness is normal.

In short, upon detecting the difference value of +1 for four times sequentially, the synchronization detector 57 determines that it is the synchronization-established state. The synchronization detector 57 notifies a CPU 81 of the control board 80 of the determination result. Furthermore, when the difference value is other than +1 in the state where the status is "000", "001", "010", and "011", the synchronization detector 57 transitions the status to "000" and determines that it is the synchronization-loss state. The synchronization detector 57 notifies the CPU 81 in the control board 80 of the result of determination on the synchronization state of the signal on the side of the active line.

FIG. 6 is an explanatory view illustrating an exemplary internal configuration of the synchronization detector 57. The synchronization detector 57 illustrated in FIG. 6 includes a difference memory 91, a difference calculation unit 92, a transition unit 93, and a register 94. The difference memory 91 is a field for storing the SN calculated for the previous frame and the SN calculated for the current frame. The difference calculation unit 92 calculates the difference value by subtracting the SN of the previous framed from the SN of the current frame. The register 94 includes a storage field 94A for storing the status of each of the latest four frames and a storage field 94B for storing the packet of each of the latest four frames. Given that the SN of the current frame is "n", the latest four frames are "n−4", "n−3", "n−2", and "n−1".

The transition unit 93 is, for example, a determination unit and a control unit that determine whether the difference value is +1 per received frame. The transition unit 93 stores the status illustrated in FIG. 5 according to the result of determination on the difference value. The transition unit 93 stores the packet with the SN of "n−4" and the status, the packet with the SN of "n−3" and the status, the packet with the SN of "n−2" and the status, and the packet with the SN of "n−1" and the status in the register 94.

FIGS. 7A and 7B are explanatory views illustrating the relationship between the SN, difference value, and status determined by the synchronization detector 57. The synchronization detector 57 determines that the difference value is +1 and the status is "100". When the synchronization detector 57 calculates the SN of "8", the synchronization detector 57 subtracts the SN of "7" of the previous frame from the SN of "8" of the current frame and, because the difference value is +1, the status is "100". When the synchronization detector 57 calculates the SN of "23", the synchronization detector 57 subtracts the SN of "8" of the previous frame from the SN of "23" of the current frame and, because the difference value is +15, determines that the consecutiveness is abnormal and the status is "000".

When the synchronization detector 57 calculates the SN of "10", the synchronization detector 57 subtracts the SN of "23" of the previous frame from the SN of "10" of the current frame and, because the difference value is −13, determines that the status is "000". When the synchronization detector 57 calculates the SN of "11", the synchronization detector 57 subtracts the SN of "10" of the previous frame from the SN of "11" of the current frame and, because the difference value is +1, determines that the status is "001". When the synchronization detector 57 then calculates the SN of "12", the synchronization detector 57 subtracts the SN of "11" of the previous frame from the SN of "12" of the current frame and, because the difference value is +1, determines that the status is "010". When the synchronization detector 57 then calculates the SN of "13", the synchronization detector 57 subtracts the SN of "12" of the previous frame from the SN of "13" of the current frame and, because the difference value is +1, determines that the status is "011". When the synchronization detector 57 then calculates the SN of "14", the synchronization detector 57 subtracts the SN of "13" of the previous frame from the SN of "14" of the current frame and, because the difference value is +1, determines that the difference value of +1 has been detected for four times sequentially, that the consecutiveness is normal, and that the status is "100".

Upon transitioning the status to "100", the transition unit 93 in the synchronization detector 57 sets "100" in the storage field 94A corresponding to "n−4", "n−3", "n−2", and "n−1" for synchronization establishment signals.

The comparator 56 compares the phases of the frame on the side of the active line and the frame on the side of the spare line relating to the same SN to detect the delay difference. The comparator 56 acquires the SN of the frame on the side of the spare line from the FCS checker 54 in the second input IF board 50B. The phase adjustment memory 55 stores a predetermined number of received frames in order to absorb the signal delay difference between the frame from the active line and the frame from the spare line that have the same SN.

The second input IF board 50B includes the SFP/XFP 51, the PHY/MAC 52, the tag checker 53, the FCS checker 54, the phase adjustment memory 55, the comparator 56, the synchronization detector 57, the frame buffer 58, and the CPU 59. The second input IF board 50B detects the synchronization state on the side of the spare line from the SN of the signal from the fifth line 5E on the side of the fourth relay device 4D. The synchronization detector 57 notifies the CPU 81 of the control board 80 of the result of determination on the synchronization state of the signal on the side of the spare line.

For example, when the synchronization state on the side of the spare line in the second input IF board 50B is the synchronization-established state and the synchronization state on the side of the active line in the first input IF board 50A is the synchronization-loss state, a switch trigger generator 82 in the control board 80 controls the signal switch unit 71 in the SW board 70 to perform a switch output to switch the output of the frame corresponding to the SN for which it is determined that there is a determination loss from the active line to the spare line. The signal switch unit 71 performs a switch output to switch from the signal stored in the phase adjustment memory 55 on the side of the active line in the first input IF board to the signal having the same SN and stored in the phase adjustment memory 55 on the side of the spare line in the second input IF board 50B. This enables absorption of the signal delay difference between the active line and the spare line.

The output IF board 60 includes a QoS 61, a tag insertion unit 62, a CRC generator 63, a PHY/MAC 64, a SFP/XFP 65, a frame buffer 66, and a CPU 67. The CRC generator 63 calculates a CRC calculated vale from the field value in the frame of the output signal from the SW board 70 and stores the calculated CRC calculated value in the FCS byte field in the frame. The output IF board 60 outputs the output signal from the SW board 70 to the line on the side of the second user device 2B.

Figure 4B:
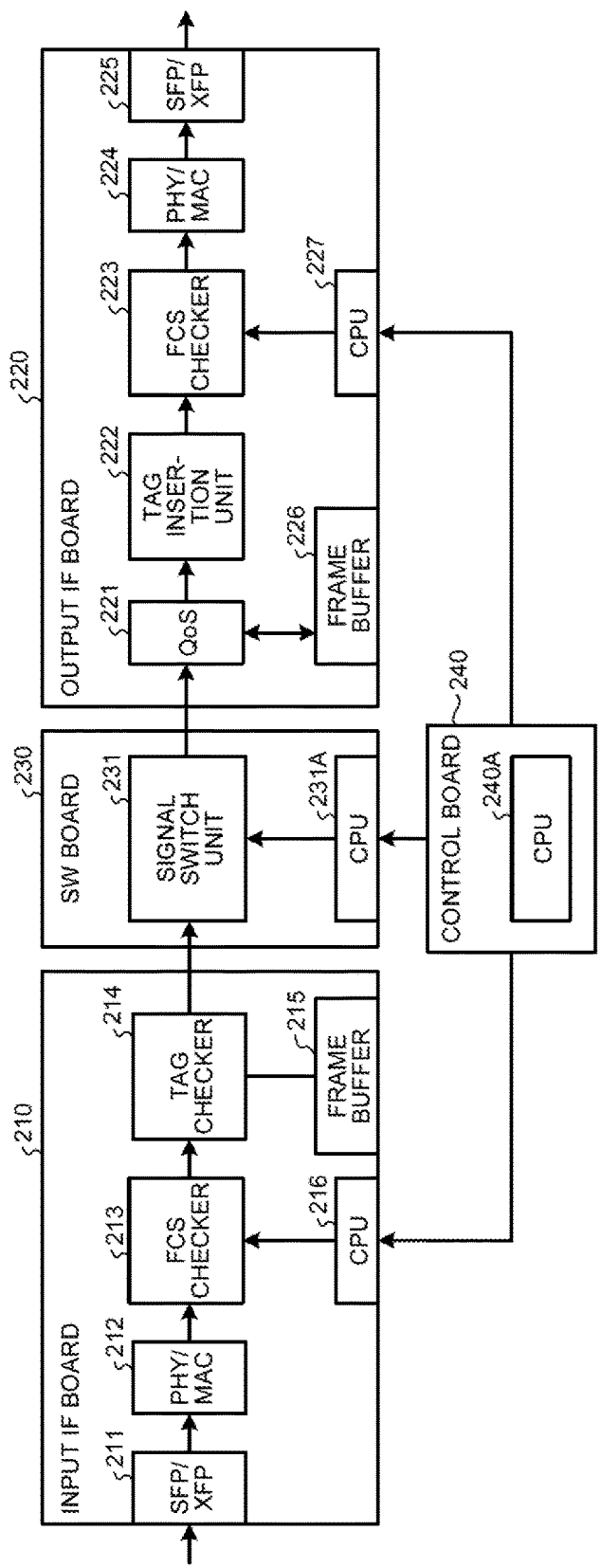
FIG. 4B is an explanatory view illustrating an exemplary configuration of a third transmission device.

FIG. 4B is an explanatory view illustrating an exemplary configuration of the third transmission device 3C. While the third transmission device 3C will be exemplified and described for convenience of descriptions, because the fourth transmission device 3D has the same configuration as that of the third transmission device 3C, the same components are denoted by the same reference numerals and the redundant descriptions of the components and operations will be omitted.

The third transmission device 3C illustrated in FIG. 4B includes an input IF board 210, an output IF board 220, an SW board 230, and a control board 240. The input IF board 210 is an input interface that connects to another line. The output IF board 220 is, for example, an interface that connects to the first relay device 4A. The SW board 230 is a switch that performs a switch output to output the output signal from the input IF board 210 to the output IF board 220. The control board 240 controls the whole third transmission device 3C.

The input IF board 210 includes a SFP/XFP 211, a PHY/MAC 212, a FCS checker 213, a tag checker 214, a frame buffer 215, and a CPU 216. The SFP/XFP 211 is a photoelectric converter that converts an optical signal from another line into an electric signal. The PHY/MAC 212 executes a process matching the physical layer on the signal and executes various processes relating to the MAC layer on the signal. The FCS checker 213 executes various processes on the basis of the FCS calculated value in the FCS byte field of the frame. The tag checker 214 refers to the VLAN tag in the frame and, when the VLAN ID of the VLAN tag matches, transmits the frame and, when the VLAN ID does not match, discards the frame. The frame buffer 215 is a field for sequentially storing received frames. The CPU 216 controls the whole input IF board 210.

The output IF board 220 includes a QoS 221, a tag insertion unit 222, a FCS checker 223, a PHY/MAC 224, a SFP/XFP 225, a frame buffer 226, and a CPU 227. The QoS 221 is a processor that controls the traffic of the output signal from the SW board 230. The tag insertion unit 222 is a processor that replaces the VLAN tag in the frame in the signal. The FCS checker 223 executes various processes on the basis of the FCS calculated value in the FCS byte field of the frame. The PHY/MAC 224 executes a process matching the physical layer on the signal and executes various processes relating to the MAC layer on the signal. The SFP/XFP 225 is a converter that performs photoelectric conversion to convert an electric signal to another line into an optical signal. The frame buffer 226 is an area for sequentially storing frames. The CPU 227 controls the whole output IF board 220.

The SW board 230 includes a signal switch unit 231 and a CPU 231A. The signal switch unit 231 performs a switch connection to switch between the input IF board 210 and the output IF board 220. The CPU 231A controls the whole SW board 230. The control board 240 includes a CPU 240A that controls the whole control board 240 and controls the whole third transmission device 3C.

FIGS. 8A and 8B are explanatory views illustrating an exemplary configuration of the first relay device 4A. The first relay device 4A illustrated in FIG. 8A, for example, connects to the first transmission device 3A via the first line 5A, connects to the third transmission device 3C via the third line 5C, and connects to the second relay device 4B via the seventh line 5G. The first relay device 4A relays the signal from the first transmission device 3A and the third transmission device 3C to the second relay device 4B.

The first relay device 4A illustrated in FIG. 8A includes a first port P1, a second port P2, and a third port P3. The first port P1 is a first input IF board 110A that connects to the first line 5A on the side of the first transmission device 3A. The second port P2 is a second input IF board 110B that connects to the third line 5C on the side of the third transmission device 3C. The third port P3 is an output IF board 120 that connects to the seventh line 5G on the side of the second relay device 4B.

The first relay device 4A illustrated in FIG. 8B includes the first input IF board 110A, the second input IF board 110B, a SW board 130, and a control board 140. The first input IF board 110A includes a SFP/XFP 111, a PHY/MAC 112, a tag checker 113, a FCS checker 114, a synchronization detector 115, a frame buffer 116, and a CPU 117. The SFP/XFP 111 is a photoelectric converter that converts an optical signal from the first line 5A into an electric signal. The PHY/MAC 112 is a component that generates a MAC frame. The FCS checker 114 includes a CRC checker 118 and an SN extraction unit 119. The CRC checker 118 calculates a CRC calculated value from the field value in the frame. The SN extraction unit 119 subtracts the CRC calculated value from the FCS calculated value stored in the FCS byte field in the frame to calculate the SN. When the accuracy of the frame is abnormal according to the CRC calculated value, the CRC checker 118 discards the frame. The tag checker 113 refers to the VLAN tag in the received frame and controls the signal output to the port corresponding to the referred VLAN tag. The tag checker 113 discards the frame when there is no port corresponding to the VLAN ID of the VLAN tag.

The synchronization detector 115 determines whether the difference value between the SN in the current frame and the SN of the previous frame that are extracted by the SN extraction unit 119 is +1 and recognizes the consecutiveness of the received frames when the difference value is +1. The contents of the processing performed by the synchronization detector 115 are the same as those of the processing performed by the synchronization detector 57 in the second transmission device 3B. The first input IF board 110A inputs the signal from the first line 5A on the side of the first transmission device 3A to the SW board 130.

A second input IF board 10B includes the SFP/XFP 111, the PHY/MAC 112, the tag checker 113, a FCS checker 114A, the frame buffer 116, and the CPU 117. The SFP/XFP 111 is a photoelectric converter that converts an optical signal from the third line 5C on the side of the third transmission device 3C into an electric signal. The PHY/MAC 112 is a component that generates a MAC frame. The FCS checker 114A checks the accuracy of the frame contents on the basis of the CRC calculated value stored in the FCS byte field in the frame. The FCS checker 114A discards the frame when the accuracy of the frame is abnormal according to the CRC calculated value. The tag checker 113 refers to the VLAN tag in the frame and controls the signal output to the port corresponding to the VLAN ID of the VLAN tag. The tag checker 113 discards the frame when there is no port corresponding to the VLAN ID of the VLAN tag. The second input IF board 110B inputs the signal from the third line 5C on the side of the third transmission device 3C to the SW board 130.

The SW board 130 includes a signal switch unit 131 and a CPU 132. The signal switch unit 131 performs a switch output to switch the signal to the output IF board 120 between the signal from the first input IF board 110A and the signal from the second input IF board 110B. The CPU 132 controls the SW board 130.

The output IF board 120 includes a first QoS 121A, a first tag insertion unit 122A, a first CRC generator 123A, a SN adder 124, a second QoS 121B, a second tag insertion unit 122B, and a second CRC generator 123B. The output IF board 120 further includes a time division multiplexer 125, a PHY/MAC 126, a SFP/XFP 127, a frame buffer 128, and a CPU 129. The first QoS 121A executes a band control in accordance with the type of the frame of the signal from the first input IF board. The first tag insertion unit 122A replaces the VLAN tag in the frame in the signal from the first QoS 121A. Furthermore, the first CRC generator 123A adds the SN to the CRC calculated value to generate the FCS calculated value, stores the calculated FCS calculated value in the FCS byte field in the frame, and inputs the frame to the time division multiplexer 125.

The second QoS 121B executes band control according to the type of the frame of the signal from the second input IF board 110B. The second tag insertion unit 122B replaces the VLAN tag in the frame in the signal from the second QoS 121B. Furthermore, the second CRC generator 123B generates the CRC calculated value on the basis of the field value in the frame, stores the calculated CRC calculated value in the FCS byte field of the frame, and inputs the frame to the time division multiplexer 125.

The time division multiplexer 125 outputs the frame from the SN adder 124 and the frame from the second CRC generator 123B by time division and outputs the frames to the seventh line 5G on the side of the second relay device 4B via the PHY/MAC 126 and the SFP/XFP 127. The control board 140 includes a CPU 141 that controls the whole control board 140.

FIGS. 9A and 9B are explanatory views illustrating an exemplary internal configuration of the second relay device 4B. The second relay device 4B illustrated in FIGS. 9A and 9B includes an input IF board 110C, a first output IF board 150A, a second output IF board 150B, the SW board 130, and the control board 140. The second relay device 4B illustrated in FIGS. 9A and 9B connects to the first relay device 4A via the seventh line 5G, connects to the second transmission device 3B via the fourth line 5D, and connects to the fourth transmission device 3D via the sixth line 5F. The second relay device 4B relays the signal from the first relay device 4A to the second transmission device 3B and the fourth transmission device 3D.

The second relay device 4B illustrated in FIG. 9A includes a fourth port P4, a fifth port P5, and a sixth port P6. The fourth port P4 is the input IF board 110C that connects to the seventh line 5G on the side of the first relay device 4A. The fifth port P5 is the first output IF board 150A that connects to the fourth line 5D on the side of the second transmission device 3B. The sixth port P6 is the second output IF board 150B that connects to the sixth line 5F on the side of the fourth transmission device 3D.

The input IF board 110C illustrated in FIG. 9B includes the SFP/XFP 111, the PHY/MAC 112, the tag checker 113, the FCS checker 114, the synchronization detector 115, the frame buffer 116, and the CPU 117. The synchronization detector 115 determines whether the difference value between the SN in the current frame and the SN in the previous frame that are extracted by the SN extraction unit 119 is +1 and, when the difference value is +1, determines that the consecutiveness of the received frames is normal. The contents of the processing performed by the synchronization detector 115 are the same as those of the processing performed by the synchronization detector 57 in the second transmission device 3B. The input IF board 110C inputs the signal from the seventh line 5G on the side of the first relay device 4A to the SW board 130.

Figure 10:
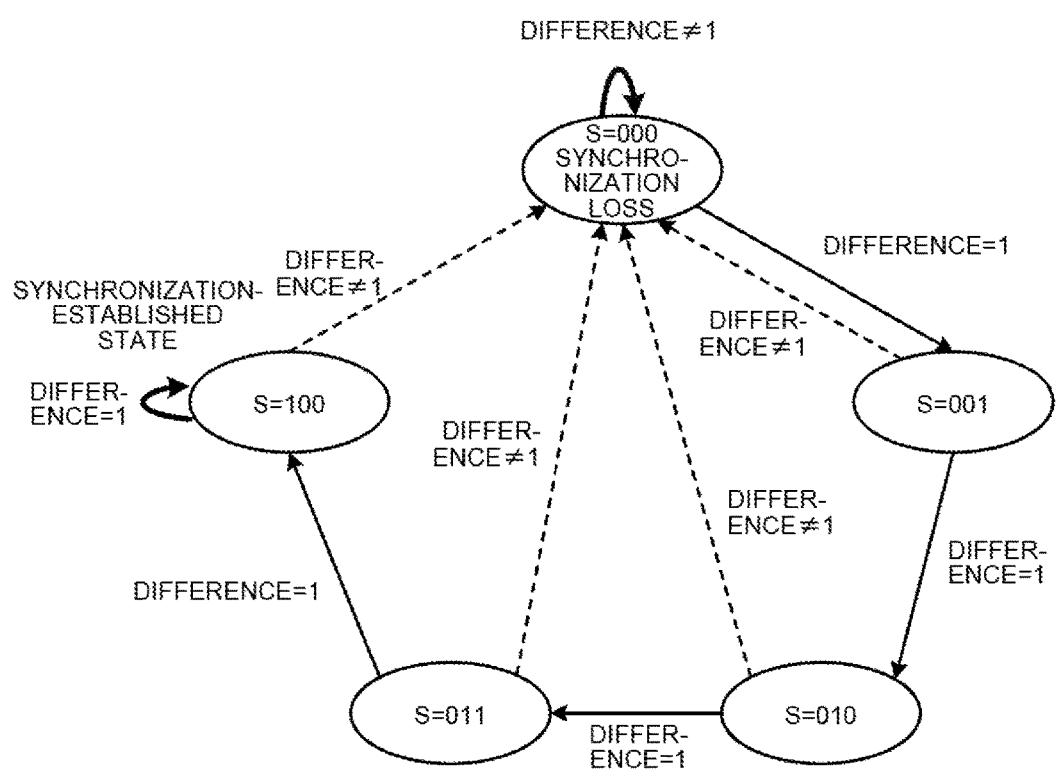
FIG. 10 is an explanatory view illustrating an exemplary transition of each status on the side of the second relay device.

FIG. 10 is an explanatory view illustrating an exemplary transition of each status on the side of the second relay device 4B. The status represented in FIG. 10 represents five types of state by three bits and "100" represents the synchronized-established state, "000", "001", "010" and "011" represent the synchronization-loss state. When the status is "100", the synchronization detector 115 determines that the frame consecutiveness is normal. When the status is "000", the synchronization detector 115 determines that the consecutiveness of the received frames is abnormal.

When the difference value between the previous frame and the current frame is +1 at the next comparison timing in the state where the status is "000", the synchronization detector 115 transitions the status to "001". Furthermore, when the difference value between the previous frame and the current frame is +1 at the next comparison timing in the state where the status is "001", the synchronization detector 115 transitions the status to "010".

Furthermore, when the difference value between the previous frame and the current frame is +1 at the next comparison timing in the state where the status is "010", the synchronization detector 115 transitions the status to "011". Furthermore, when the difference value between the previous frame and the current frame is +1 at the next comparison timing in the state where the status is "011", the synchronization detector 115 transitions the status to "100" and determines that the frame consecutiveness is normal.

In short, upon detecting the difference value of +1 for four times sequentially, the synchronization detector 115 determines that it is the synchronization-established state. The synchronization detector 115 notifies the CPU 141 of the control board 140 of the determination result. Furthermore, when the difference value is other than +1 in the state where the status is "000", "001", "010", and "011", the synchronization detector 115 transitions the status to "000" and determines that it is the synchronization-loss state. The synchronization detector 115 notifies the CPU 141 in the control board 140 of the result of determination on the synchronization state of the signal on the side of the active line.

Furthermore, the CRC checker 118 checks the accuracy of the frame contents according to the CRC calculated value of the frame. The CRC checker 118 outputs the frame when the accuracy of the frame is normal. The CRC checker 118 discards he frame when the accuracy of the frame is abnormal. The tag checker 113 refers to the VLAN tag in the frame and discards the frame when, for example, the VLAND ID is other than "2".

The signal switch unit 131 in the SW board 130 performs a switch output to output the frame where VLAN ID=1 to the first output IF board 150A and output the frame where VLAN ID=2 to the second output IF board 150B.

The first output IF board 150A includes a first QoS 151A, a first tag insertion unit 152A, a first CRC generator 153A, an SN adder 154A, a PHY/MAC 155A, a SFP/XFP 156A, a frame buffer 157A, and a CPU 158A. The first QoS 151A controls the signal output band according to the type in the frame where VLAN ID=1. The first tag insertion unit 152A replaces the VLAN tag in the frame of the signal from the first QoS 151A. Furthermore, the first CRC generator 153A generates the CRC calculated value on the basis of the field value in the frame. Furthermore, the SN adder 154A adds the SN to the CRC calculated value to generate the FCS calculated value and stores the FCS calculated value in the FCS byte field in the frame. Furthermore, the SN adder 154A outputs the frame to the fourth line 5D on the side of the second transmission device 3B via the PHY/MAC 155A and the SFP/XFP 156A.

The second output IF board 150B includes a second QoS 151B, a second tag insertion unit 152B, a second CRC generator 153B, a PHY/MAC 154B, a SFP/XFP 155B, a frame buffer 156B, and a CPU 157B. The second QoS 151B controls the signal output band according to the type in the frame where VLAN ID=2. The second tag insertion unit 152B replaces the VLAN tag in the frame in the signal from the second QoS 151B. Furthermore, the second CRC generator 153B generates the CRC calculated value on the basis of the field value in the frame and stores the CRC calculated value in the FCS byte field in the frame. The second CRC generator 153B outputs the frame to the sixth line 5F on the side of the fourth transmission device 3D via the PHY/MAC 154B and the SFP/XFP 155B.

FIGS. 11A and 11B are explanatory views illustrating an exemplary configuration of the third relay device 4C. The third relay device 4C illustrated in FIGS. 11A and 11B includes an input IF board 110D, an output IF board 160, the SW board 130, and the control board 140. The third relay device 4C illustrated in FIGS. 11A and 11B, for example, connects to the first transmission device 3A via the second line 5B and connects to the fourth relay device 4D via the eighth line 5H. The third relay device 4C relays the signal from the first transmission device 3A to the fourth relay device 4D.

The third relay device 4C illustrated in FIG. 11A includes a seventh port P7 and a eighth port P8. The seventh port P7 is the input IF board 110D that connects to the second line 5B on the side of the first transmission device 3A. The eighth port P8 is the output IF board 160 that connects to the eighth line 5H on the side of the fourth relay device 4D.

The input IF board 110D illustrated in FIG. 11B includes the SFP/XFP 111, the PHY/MAC 112, the tag checker 113, the FCS checker 114, the synchronization detector 115, the frame buffer 116, and the CPU 117. The tag checker 113 discards the frame when there is no port corresponding to the VLAN ID of the VLAN tag. The synchronization detector 115 determines whether the difference value between the SN in the current frame and the SN in the previous frame that are extracted by the SN extraction unit 119 is +1 and, when the difference value is +1, recognizes the consecutiveness of the received frames. The contents of the processing performed by the synchronization detector 115 are the same as those of the processing performed by the synchronization detector 57 in the second transmission device 3B. The input IF board 110D inputs the signal from the second line 5B on the side of the first transmission device 3A to the SW board 130. The signal switch unit 131 in the SW board 130 outputs the frame where VLAN ID=1 to the output IF board 160.

The output IF board 160 includes a QoS 161, a tag insertion unit 162, a CRC generator 163, a SN adder 164, a PHY/MAC 165, a SFP/XFP 166, a frame buffer 167, and a CPU 168. The QoS 161 controls the signal output band according to the type in the frame where VLA ID=1. The tag insertion unit 162 replaces the VLAN tag in the frame of the signal from the QoS 161. Furthermore, the CRC generator 163 generates the CRC calculated value on the basis of the field value in the frame. Furthermore, the SN adder 164 adds the SN to the CRC calculated value to generate a FCS calculated value and stores the FCS calculated value in the FCS byte field in the frame. The SN adder 164 outputs the frame to the eighth line 5H on the side of the fourth relay device 4D via the PHY/MAC 165 and the SFP/XFP 166.

Figure 12:
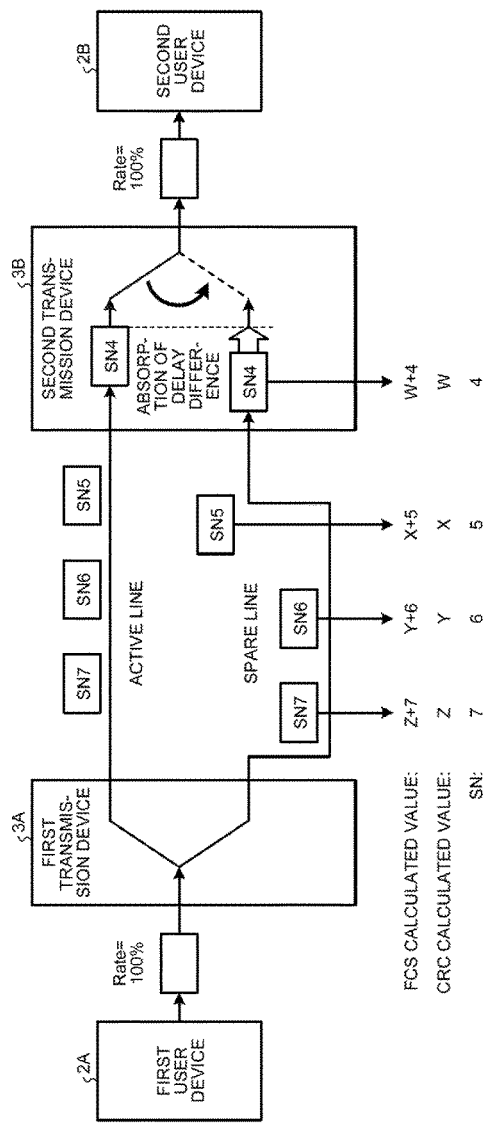
FIG. 12 is an explanatory view illustrating exemplary signal transmission operations between the first transmission device and the second transmission device.

The operations of the transmission system 1 according to the embodiment will be described here. FIG. 12 is an explanatory view illustrating exemplary signal transmission operations between the first transmission device 3A and the second transmission device 3B. Practically, the first transmission device 3A and the second transmission device 3B transmit signals via the first relay device 4A and the second relay device 4B; however, for convenience of descriptions, descriptions of the processing performed by the first relay device 4A and the second relay device 4B will be omitted for convenience of descriptions.

Suppose the SN of the frame with the CRC calculated value of "W" is "4", the SN of the frame with the CRC calculated value of "X" is "5", the SN of the frame with the CRC calculated value of "Y" is "6", and the SN of the frame with the CRC calculated value of "Z" is "7". Suppose that the frame to be flown from the first transmission device 3A to the second transmission device 3B is in the state of the rate of 100% where there is no free space in the payload filed. The first transmission device 3A transmits and outputs the signals to the second transmission device 3B via the active line and spare line according to the order in which the SNs "4", "5", "6", "7" . . . appear in this sentence.

When transmitting and outputting the frame with the SN of "4" to the second transmission device 3B via the active line and the spare line, the first transmission device 3A calculates the FCS calculated value of "W+4" from CRC calculated value of "W"+SN of "4". The first transmission device 3A transmits and outputs the frame in which the FCS calculated value of "W+4" is stored in the FCS byte field to the second transmission device 3B via the active line and the spare line. When transmitting and outputting the frame with the SN of "5" to the second transmission device 3B via the active line and the spare line, the first transmission device 3A then calculates the FCS calculated value of "X+5" from CRC calculated value of "X"+SN of "5". The first transmission device 3A transmits and outputs the frame in which the FCS calculate value of "X+5" is stored in the FCS byte field to the second transmission device 3B via the active line and the spare line.

When transmitting and outputting the frame with the SN of "6" to the second transmission device 3B via the active line and the spare line, the first transmission device 3A calculates the FCS calculated value of "Y+6" from CRC calculated value of "Y"+SN of "6". The first transmission device 3A transmits and outputs the frame in which the FCS calculated value "Y+6" is stored in the FCS byte field to the second transmission device 3B via the active line and the spare line. When transmitting and outputting the frame with the SN of "7" to the second transmission device 3B via the active line and the spare line, the first transmission device 3A calculates the FCS calculated value of "Z+7" from CRC calculated value of "Z"+SN of "7". The first transmission device 3A transmits and outputs the frame in which the FCS calculated value "Z+7" is stored in the FCS byte field to the second transmission device 3B via the active line and the spare line.

In short, because the first transmission device 3A stores the FCS calculated value calculated according to CRC calculated value+SN in the FCS byte field of the frame and transmits and outputs the frame to the second transmission device 3B, the transmission is enabled without increasing the byte length of the frame.

In the second transmission device 3B, the phase adjustment memory 55 absorbs the signal delay difference between frames having the same SN from the first transmission device 3A that are received via the active line and the spare line. The second transmission device 3B sequentially stores the frames having the same SN from the active line and the spare line in the phase adjustment memory 55 and, according to the phase of the delayed frame, outputs the signal from the line to the line on the side of the second user device 2B.

Figure 13:
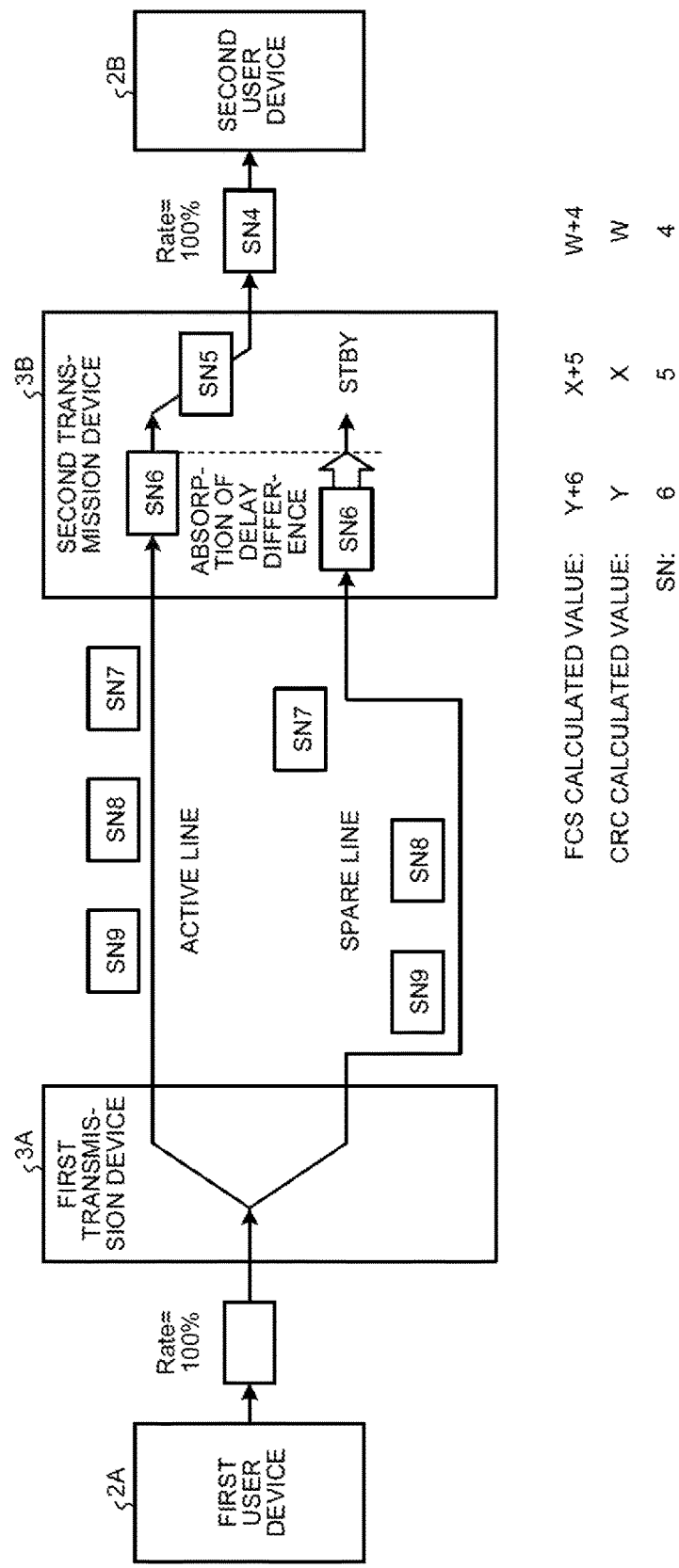
FIG. 13 is an explanatory view illustrating a signal receiving operation on the side of the second transmission device.

FIG. 13 is an explanatory view illustrating a signal receiving operation on the side of the second transmission device 3B. When the consecutiveness of the signals received from the first transmission device 3A via the active line and the spare line is normal, the second transmission device 3B transmits and outputs the signal from the active line to the line on the side of the second user device 2B. After calculating the CRC calculated value of "W" of the received frame, the second transmission device 3B subtracts the CRC calculated value of "W" from the FCS calculated value of "W+4" in the frame to calculate the SN of "4" of the current frame. The second transmission device 3B determines that the frame consecutiveness is normal when the difference between the SN of "4" of the current frame and the SN of "3" of the previous frame is +1.

Furthermore, after calculating the CRC calculated value of "X" of the received frame, the second transmission device 3B subtracts the CRC calculated value of "X" from the FCS calculated value of "X+5" in the frame to calculate the SN of "5" of the current frame. The second transmission device 3B determines that the frame consecutiveness is normal when the difference between the SN of "5" of the current frame and the SN of "4" of the previous frame is +1. Then, after calculating the CRC calculated value of "Y" of the received frame, the second transmission device 3B subtracts the CRC calculated value "Y" from the FCS calculated value of "Y+6" in the frame to calculate the SN of "6" of the current frame. The second transmission device 3B determines that the frame consecutiveness is normal when the difference between the SN of "6" of the current frame and the SN of "5" of the previous frame is +1. In short, the second transmission device 3B determines that the consecutiveness of the signals from the active line is normal when the difference between the SN of the previous frame from the active line and the SN of the current frame from the active line is +1. Similarly, the second transmission device 3B determines that the consecutiveness of the signals from the spare line is normal when the difference between the SN of the previous frame from the spare line and the SN of the current frame from the spare line is +1.

Figure 14:
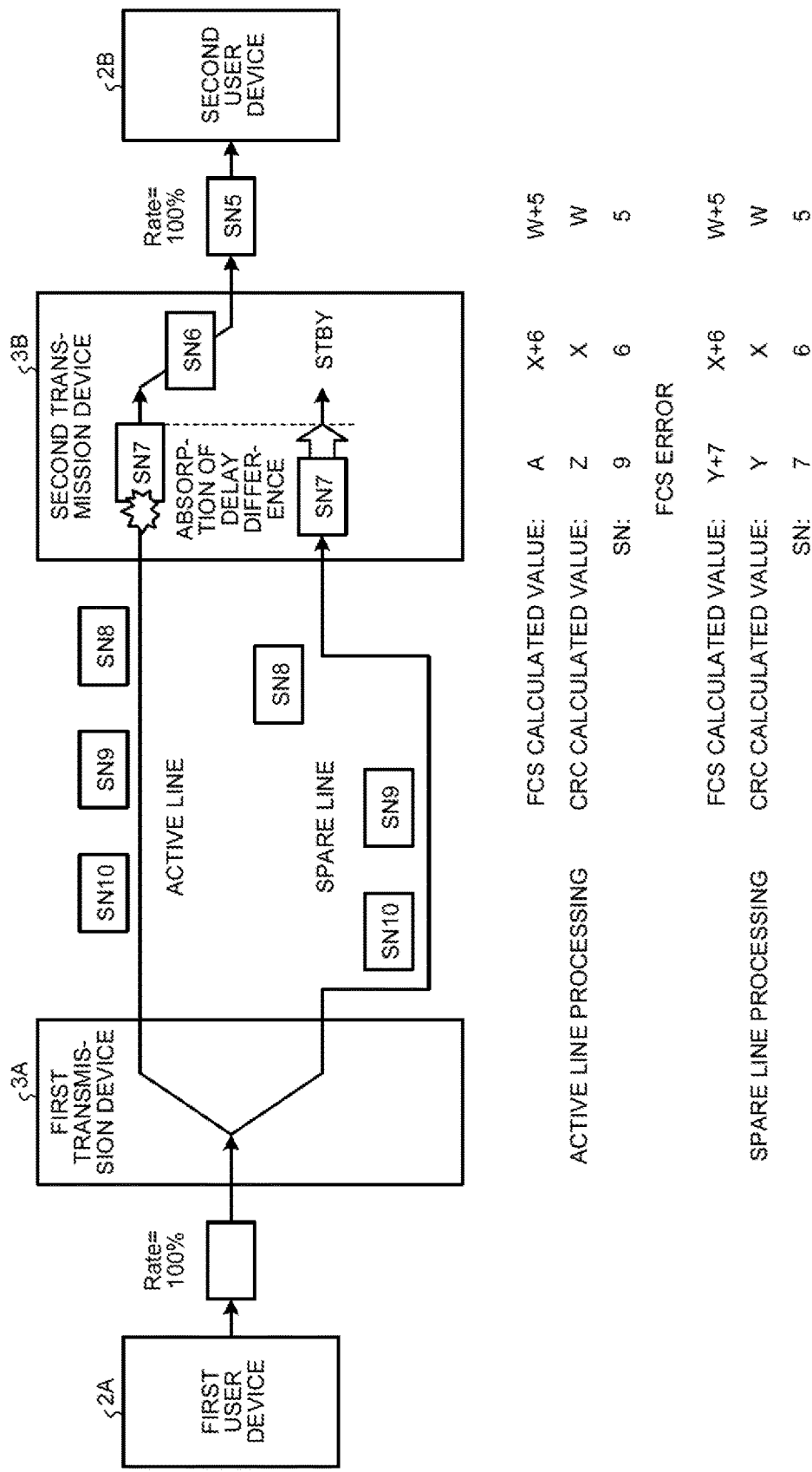
FIG. 14 is an explanatory view illustrating an abnormality detecting operation on the side of the second transmission device.

FIG. 14 is an explanatory view illustrating an abnormality detecting operation on the side of the second transmission device 3B. Descriptions will be provided below for the processing operation, on the side of the second transmission device 3B, of detecting abnormality in the consecutiveness of the signals with the SN of "7" on the active line, which is the operation performed when the second transmission device 3B receives the signals according to the order in which the SNs of "5", "6", "7" and "8" appear in this sentence.

Suppose that the second transmission device 3B calculates the SN of "6" from the received frame from the active line in the state where the frame consecutiveness is normal. Because the difference value between the SN of "5" of the previous frame and the SN of "6" of the current frame is +1, the second transmission device 3B determines that the frame consecutiveness of the active line is normal. Suppose that the second transmission device 3B calculates the CRC calculated value of "Z" from the received frame from the active line and subtracts the CRC calculated value of "Z" from the FCS calculated value of "A" to calculate the SN of "9". Because the difference between the SN of "9" of the current frame and the SN of "6" of the previous frame is other than +1, the second transmission device 3B determines that the frame consecutiveness is abnormal. As for the received frames of the spare line, the second transmission device 3B determines that the consecutiveness of the frames with the SNs of "5", "6", and "7" is normal.

Figure 15:
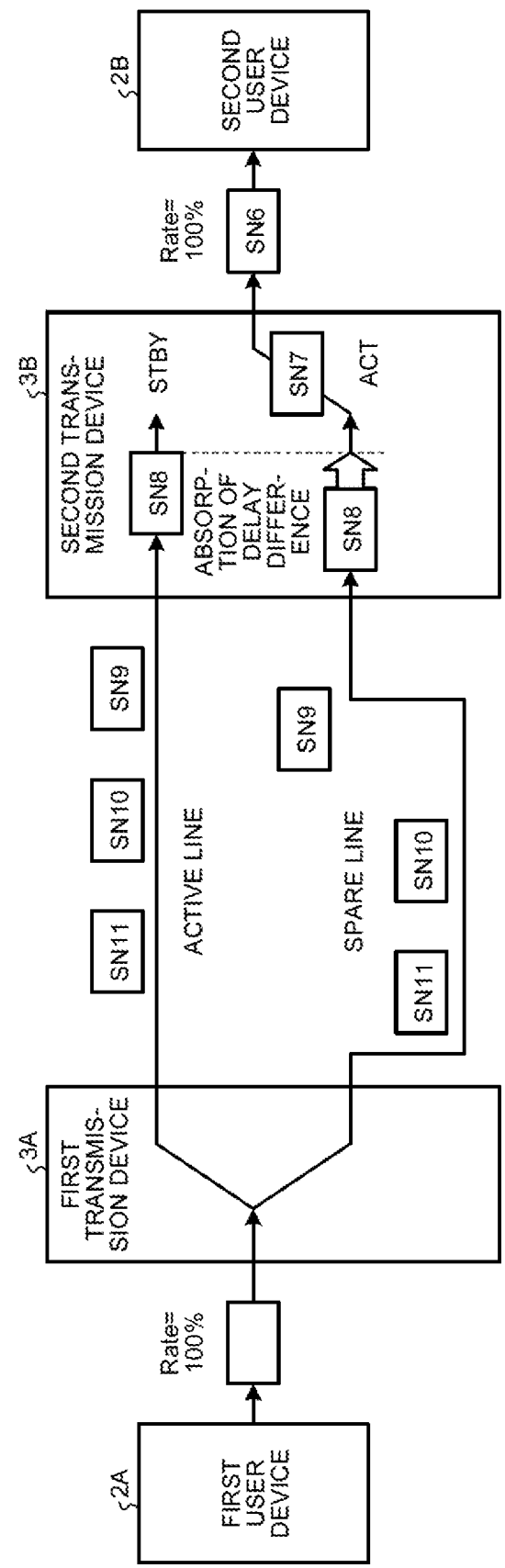
FIG. 15 is an explanatory view illustrating a signal switching operation on the side of the second transmission device.

FIG. 15 is an explanatory view illustrating a signal switching operation on the side of the second transmission device 3B. Suppose that the second transmission device 3B determines that the consecutiveness of the received frames on the side of the active line is abnormal and determines that the consecutiveness of the received frames on the side of the spare line is in the normal state.

Because the consecutiveness of received frames on the side of the active line is abnormal, the second transmission device 3B discards the received frame from the active line and performs a switch output to output the frame of the signal with the SN of "7" on the side of the spare line stored in the phase adjustment memory 55 to the second user device 2B. This enables the second transmission device 3B to transmit and output the frame received from the first transmission device 3A via the spare line without interruption.

Figure 16:
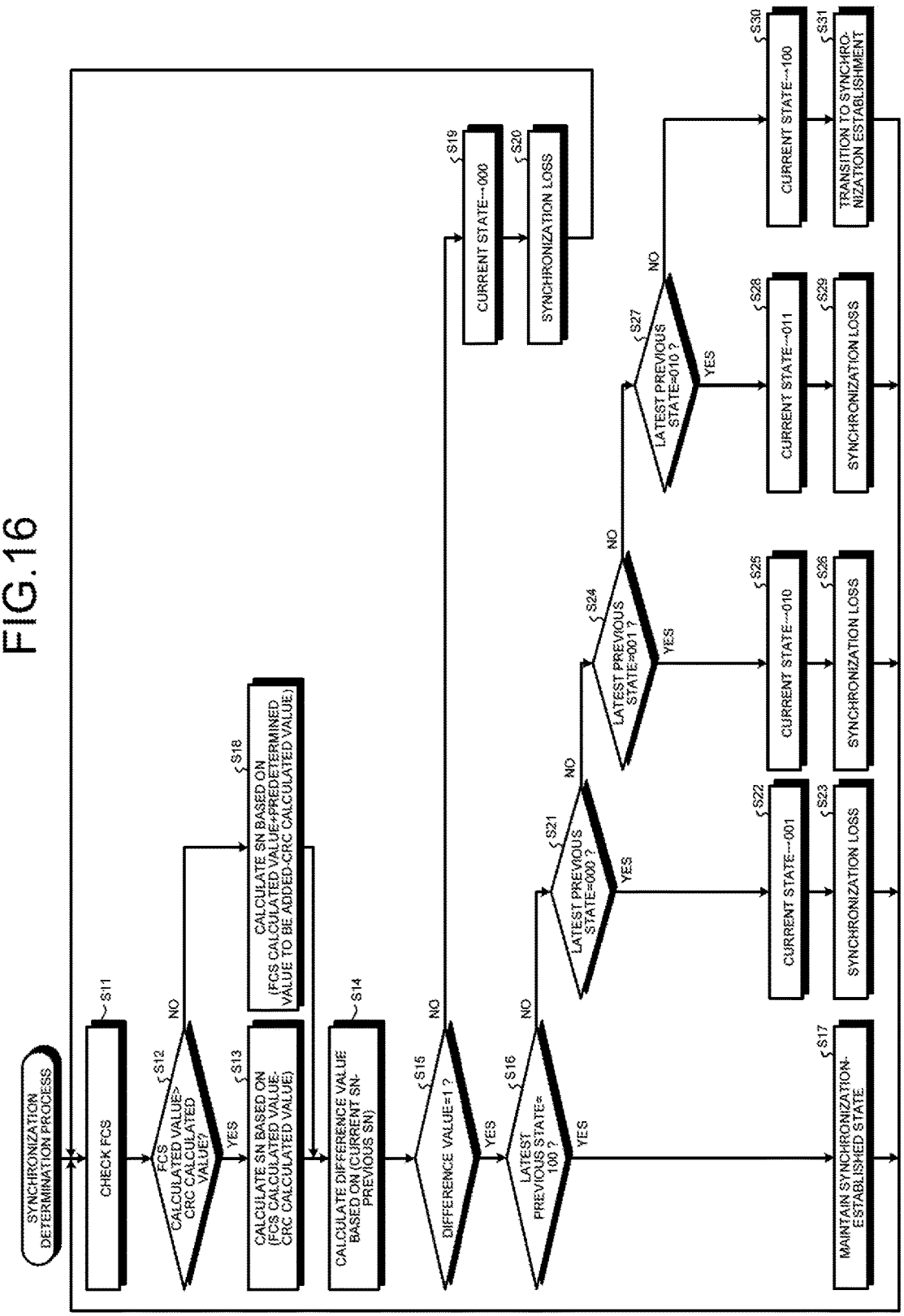
FIG. 16 is a flowchart illustrating exemplary processing operations on the side of the transmission device that relate to a synchronization determination process.

FIG. 16 is a flowchart illustrating exemplary processing operations on the side of the transmission device 3 that relate to a synchronization determination process. The synchronization determination process illustrated in FIG. 16 is a process of monitoring the synchronization state of consecutiveness of received frames according to the SNs of the anteroposterior frames. The synchronization determination process is executed between the active line and the spare line.

The FCS checker 54 in the transmission device 3 checks the FCS calculated value in the FCS byte field of the received frame (step S11). The FCS checker 54 calculates the CRC calculated value from the field value in the received frame via the CRC checker 54A and determines whether the FCS calculated value in the FCS byte field is larger than the CRC calculated value (step S12).

When the FCS calculated value in the FCS byte field is larger than the CRC calculated value (YES at step S12), the SN extraction unit 54B in the FCS checker 54 calculates the SN according to FCS calculated value–CRC calculated value (step S13). The synchronization detector 57 calculates the difference value between he SN calculated for the current frame and the SN calculated for the previous frame (step S14). The synchronization detector 57 determines whether the difference value between the SNs is +1 (step S15).

When the SN difference value is +1 (YES at step S15), the synchronization detector 57 determines that the consecutiveness of the received frames is normal and determines whether the latest previous state is "100" (step S16). When the latest previous state is "100", the received frames represent the synchronization-established state. Suppose that the synchronization detector 57 holds the latest four previous states.

When the latest previous state is "100" (YES at step S16), the synchronization detector 57 determines that the received frames are in the synchronization-established state (step S17) and moves to step S11 in order to execute the FCS check on the following received frame.

When the FCS calculated value in the FCS byte field is not larger than the CRC calculated value (NO at step S12), the SN extraction unit 54B calculates the SN according to (FCS calculated value+predetermined value to be added)−CRC calculated value (step S18) and moves to step S14 in order to calculate the SN difference value. When the FCS calculated value is not larger than the CRC calculated value, it is determined there is an increase in digit on the sending side. Supposed that, on the side of the transmitting transmission device 3, the CRC calculated value is "0x000000003", the SN is "0xFFFFFFFE", and the FCS calculate value=0x000000003+0xFFFFFFFE=0x100000001=0x00000001. Suppose that, on the received frame, the CRC calculated value is "0x000000003", the FCS calculated value is "0x00000001", and the predetermined value to be added is "0x100000000". The receiving transmission device 3 performs the calculation according to according to SN=(FCS calculated value+predetermined value to be added)−CRC calculated value, i.e., SN=(0x00000001−0x100000000)−0x00000003.

When the difference value is not +1 (NO at step S15), the synchronization detector 57 determines that the frame consecutiveness is abnormal and transitions the current state to "000" (step S19). Furthermore, the synchronization detector 57 determines that there is a synchronization loss (step S20) and moves to step S11 in order to execute a FCS check on the following received frame.

When the previous state is not "100" (NO at step S16), the synchronization detector 57 determines whether the latest previous state is "000" (step S21). When the latest previous state is "000" (YES at step S21), the synchronization detector 57 transitions the current state to "001" (step S22), determines that there is a synchronization loss (step S23), and moves to step S11 in order to execute the FCS check on the following received frame.

When the previous state is not "000" (NO at step S21), the synchronization detector 57 determines whether the latest previous state is "001" (step S24). When the latest previous state is "001" (YES at step S24), the synchronization detector 57 transitions the current state to "010" (step S25), determines that there is a synchronization loss (step S26), and moves to step S11 in order to execute the FCS check on the following received frame.

When the previous state is not "001" (NO at step S24), the synchronization detector 57 determines whether the latest previous state is "010" (step S27). When the latest previous state is "010" (YES at step S27), the synchronization detector 57 transitions the current state to "011" (step S28), determines that there is a synchronization loss (step S29), and moves to step S11 to execute the FCS check on the following received frame.

When the previous state is not "010" (NO at step S27), the synchronization detector 57 determines that the latest previous state is "011" and transitions the current state to "100" (step S30). After transitioning the current sate to "100", the synchronization detector 57 determines that it is the synchronization-established state (step S31) and moves to step S11 to execute the FCS check on the following received frame. In short, when the state where the SN difference value is +1 is detected for four times successively, it is determined that the synchronization state between received frames has been established.

The transmission device 3 that executes the synchronization determination process illustrated in FIG. 16 calculates the CRC calculated value of the received frame and, when the FCS calculated value is larger than the CRC calculated value, calculate the SN from (FCS calculated value−CRC calculated value). When the difference between the SN of the current frame and the SN of the previous frame is +1, the transmission device 3 determines that the consecutiveness of the received frames is normal. This enables the transmission device 3 to determine that the consecutiveness of the received frames is normal.

The transmission device 3 determines that the consecutiveness of the received frames is abnormal when the difference between the SN of the current frame and the SN of the previous frame is other than +1. This enables the transmission device 3 to determine that the consecutiveness of the received frames is abnormal.

When the FCS calculated value is not larger than the CRC calculated value, the transmission device 3 calculates the SN from (FCS calculated value+predetermined value to be added)−the CRC calculated value. This enables the transmission device 3 to calculate the SN even when there is an increase in digit in the SN on the transmitting side.

When the difference between the SN of the current frame and the SN of the previous frame is +1, the transmission device 3 determines that the consecutiveness of the received frames is normal. This enables the transmission device 3 to determine that the consecutiveness of the received frames is normal.

When detecting the detection result representing that the difference is +1 continues for four times or more consecutively after the transmission device 3 determines that the consecutiveness of the received frames is abnormal, the transmission device 3 determines that the consecutiveness of the received frames is normal.

Figure 17:
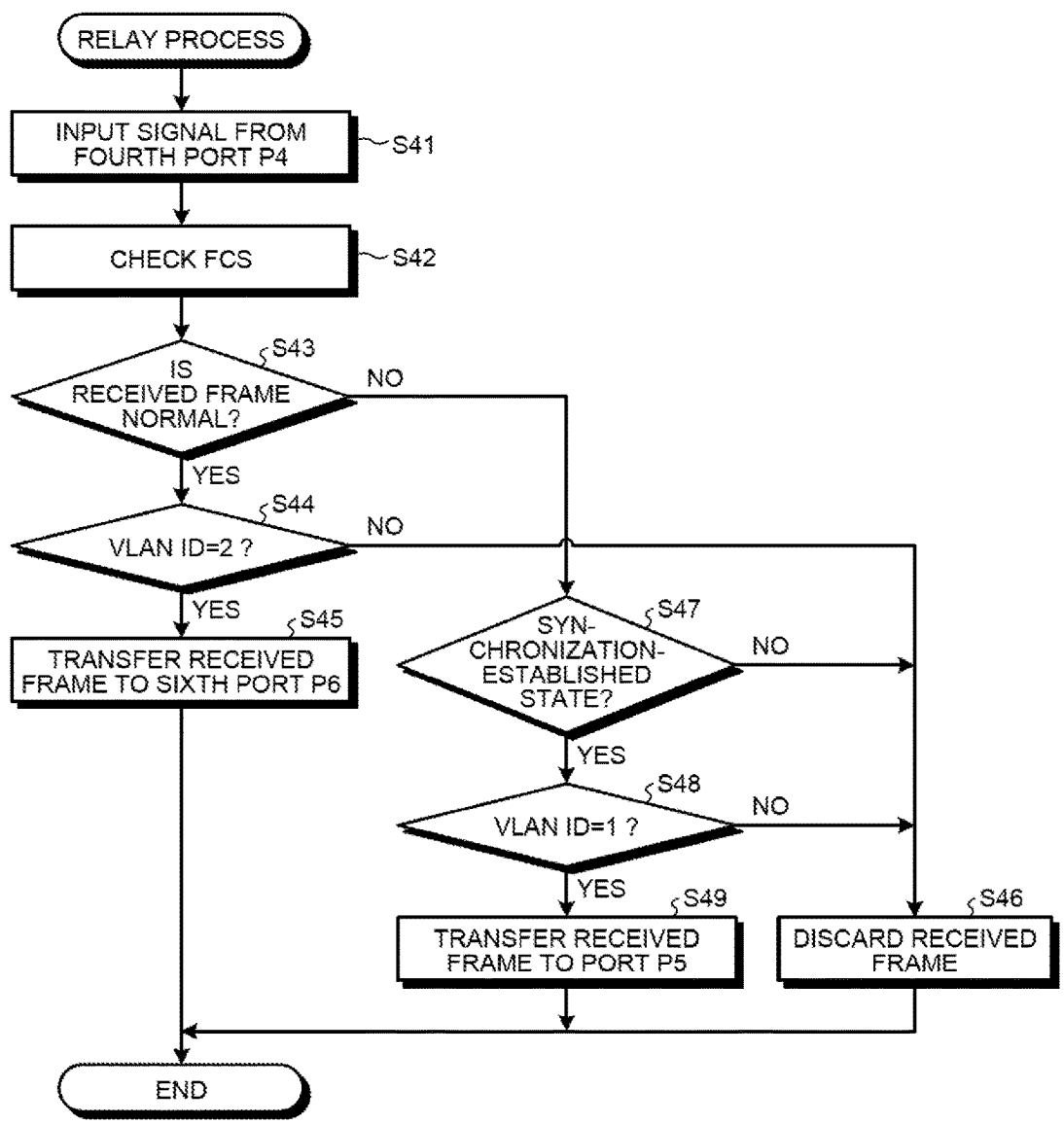
FIG. 17 is a flowchart illustrating exemplary processing operations on the side of the second relay device that relate to a relay process.

FIG. 17 is a flowchart illustrating exemplary processing operations on the side of the second relay device 4B that relate to the relay process. The relay process illustrated in FIG. 17 is the process of relaying and transferring received frames.

The FCS checker 114 in the second relay device 4B inputs a signal from the fourth port P4 (step S41) and executes a FCS check on the received frame (step S42). The FCS checker 114 determines whether the received frame is normal on the basis of the CRC calculated value of the received frame (step S43).

When the received frame is normal (YES at step S43), the tag checker 113 in the second relay device 4B refers to the VLAN tag in the received frame and determines whether the VLAN ID is "2" (step S44). When the VLAN ID is "2" (YES at step S44), the control board 140 in the second relay device 4B transfers the received frame to the sixth port P6 (step S45) and ends the processing operation illustrated in FIG. 17.

When the VLAN ID is not "2" (NO at step S44), the tag checker 113 discards the received frame (step S46) and ends the processing operation illustrated in FIG. 17. When the received frame is not normal (NO at step S43), the FCS checker 114 determines whether the received frames are in the synchronization-established state on the basis of the SN difference value (step S47).

When the received frames are in the synchronization-established state (YES at step S47), the tag checker 113 refers to the VLAN tag of the received frame and determines whether the VLAN ID is "1" (YES at step S48). When the VLAN ID is "1" (YES at step S48), the control board 140 transfers and outputs the received frame to the fifth port P5 (step S49) and ends the process illustrated in FIG. 17.

When the received frames are not in the synchronization-established state (NO at step S47), the synchronization detector 115 moves to step S46 in order to discard the received frame. When the VLAN ID is not "1" (NO at step S48), the tag checker 113 moves to step S46 in order to discard the received frame.

When the received frame is normal according to the CRC calculated value, the second relay device 4B that executes the relay process illustrated in FIG. 17 transfers and outputs the received frame to a predetermined port according to the VLAN tag in the received frame.

For example, when the received frame is abnormal according to the CRC calculated value, i.e., when there is no port corresponding to the VLAN tag of the received frame or there is a synchronization loss between the received frames, the second relay device 4B discards the received frame.

Figure 18:
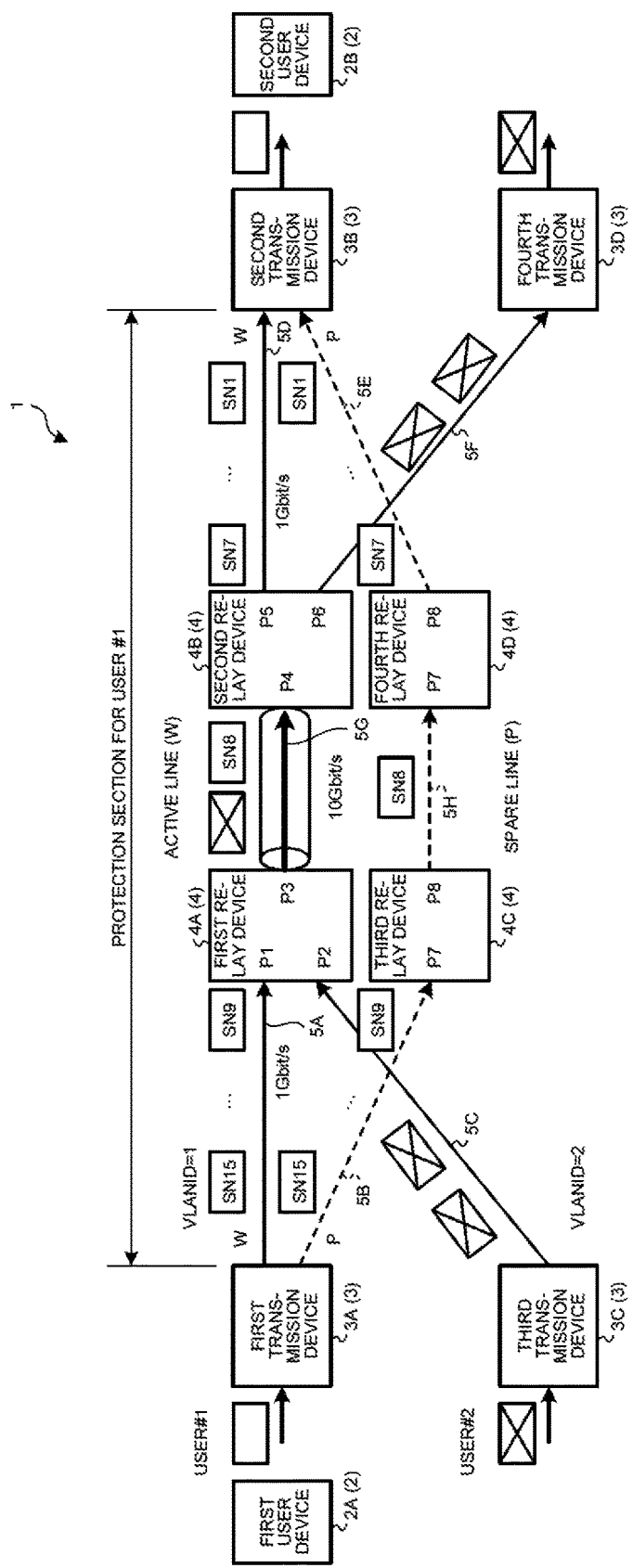
FIG. 18 is an explanatory view illustrating an exemplary transmission system in a normal state.

FIG. 18 an explanatory view illustrating the exemplary transmission system 1 in a normal state. The first transmission device 3A illustrated in FIG. 18 is capable of transmitting the signals SN1 to SN15 where the VLAN ID="1" to the second transmission device 3B via the first line 5A, the first relay device 4A, the seventh line 5G, the second relay device 4B, and the fourth line 5D, serving as the active line.

The first transmission device 3A is capable of transmitting the signal where the VLAN ID="1" to the second transmission device 3B via the second line 5B, the third relay device 4C, the eighth line 5H, the fourth relay device 4D, and the fifth line 5E, serving as the spare line.

The third transmission device 3C is capable of transmitting the signal where the VLAN ID="2" to the fourth transmission device 3D via the third line 5C, the first relay device 4A, the seventh line 5G, the second relay device 4B and the sixth line 5F.

Figure 19:
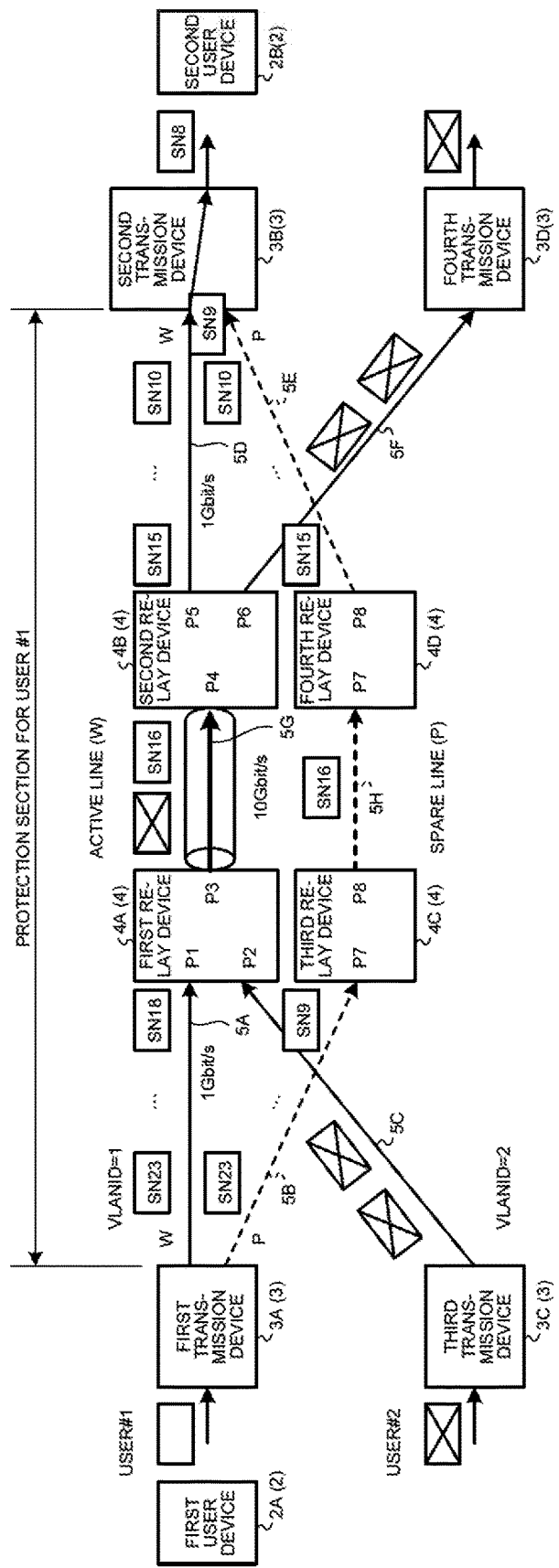
FIG. 19 is an explanatory view illustrating an exemplary transmission system running an active line.

FIG. 19 is an explanatory view illustrating the transmission system 1 in operation. The second transmission device 3B illustrated in FIG. 19 receives signals from the first transmission device 3A via the active line and the spare line. The second transmission device 3B receives the signal from the active line and the signal from the spare line and, because the state of the signal from the active line is normal, outputs the signal from the active line.

Figure 20:
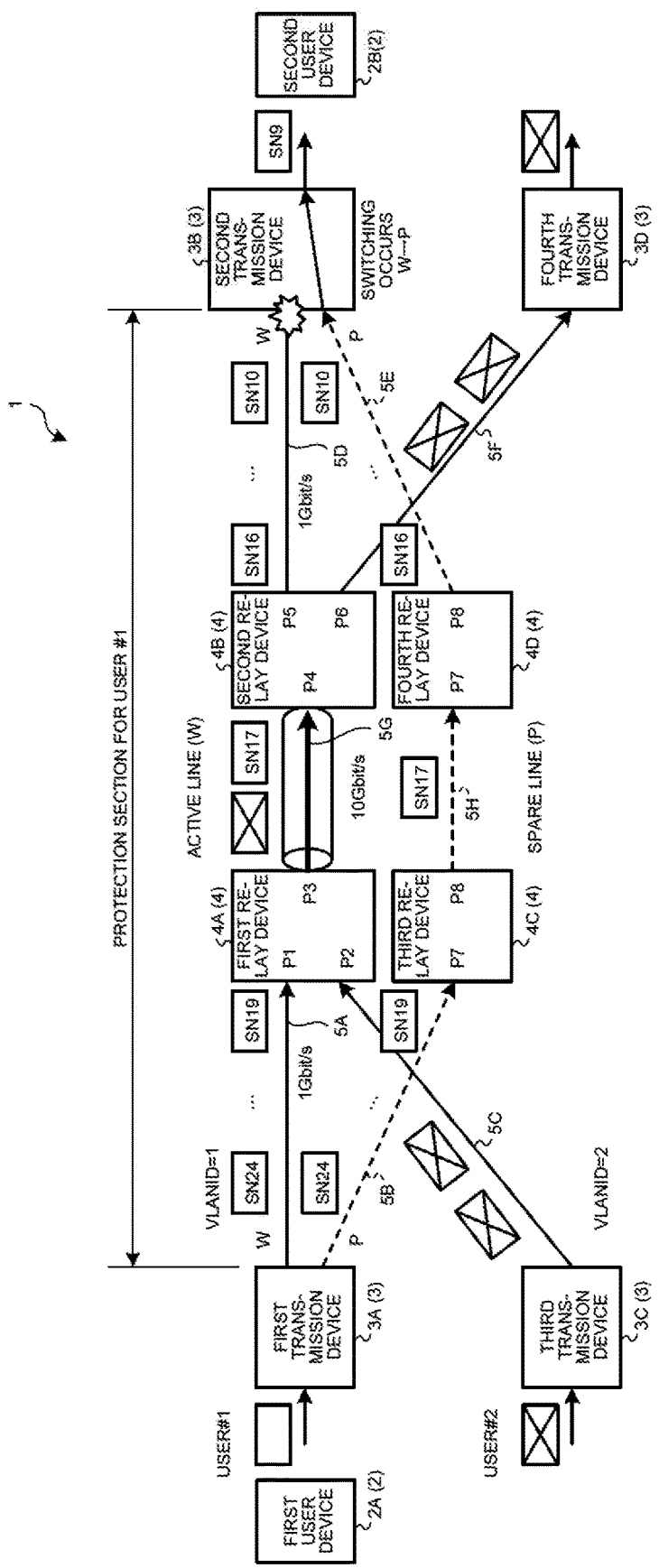
FIG. 20 is an explanatory view illustrating an exemplary transmission system in an abnormal state.

FIG. 20 is an explanatory view illustrating the exemplary transmission system 1 in an abnormal state. When the signal from the active line is abnormal, the second transmission device 3B illustrated in FIG. 20 performs a switch output to switch from the signal from the active line and the signal from the spare line.

Figure 21:
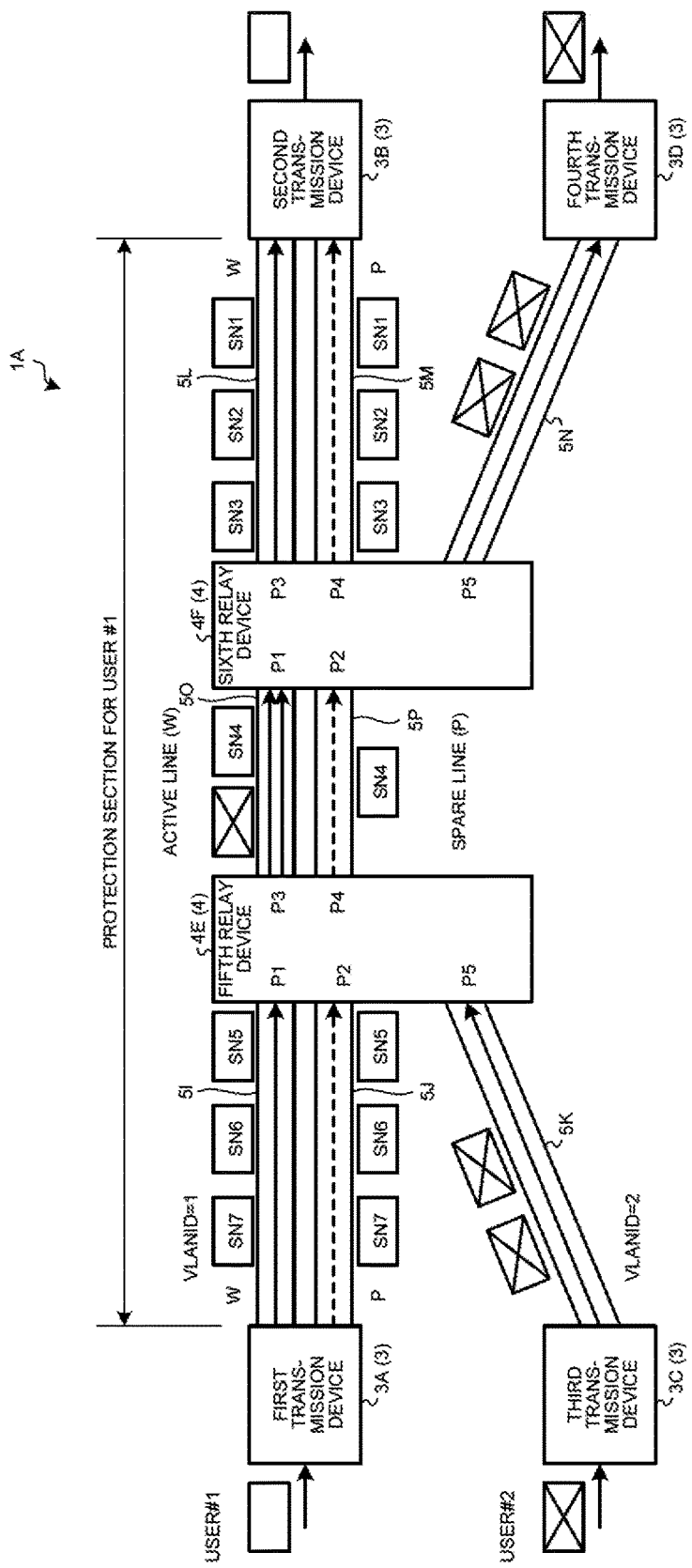
FIG. 21 is an explanatory view illustrating an exemplary linear transmission system.

The present invention may be applied to a linear transmission system 1A illustrated in FIG. 21 in addition to the transmission system according to the embodiment. FIG. 21 is an explanatory view of the exemplary linear transmission system 1A. The transmission system 1A illustrated in FIG. 21 includes a fifth relay device 4E and a sixth relay device 4F instead of the first to fourth relay devices 4A to 4D.

The first transmission device 3A connects to the fifth relay device 4E via an eleventh line 5I and a twelfth line 5J. The third transmission device 3C connects to the fifth relay device 4E via a thirteenth line 5K. The second transmission device 3B connects to the sixth relay device 4F via a fourteenth line 5L and a fifteenth line 5M. The fourth transmission device 3D connects to the sixth relay device 4F via a sixteenth line 5N. The fifth relay device 4E connects to the sixth relay device 4F via a seventeenth line 5O and an eighteenth line 5P.

The first transmission device 3A is capable of outputting the signal where VLAN ID=1 to the second transmission device 3B via the eleventh line 5I, the fifth relay device 4E, the seventeenth line 5O, the sixth relay device 4F, and the fourteenth line 5L, each serving as the active line.

The first transmission device 3A is capable of outputting the signal where VLAN ID=1 to the second transmission device 3B via the twelfth line 5J, the fifth relay device 4E, the eighteenth line 5P, the sixth relay device 4F, and the fifteenth line 5M, each serving as the spare line. In short, the first transmission device 3A outputs the signal in which the FCS calculated value is stored to the second transmission device 3B by using the active line and outputs the signal in which the FCS calculated value is stored to the second transmission device 3B by using the spare line.

The third transmission device 3C is capable of transmitting the signal where VLAN ID=2 to the fourth transmission device 3D via the thirteenth line 5K, the fifth relay device 4E, the eighteenth line 5P, the sixth relay device 4F, and the sixteenth line 5N.

The first transmission device 3A in the linear transmission system 1A illustrated in FIG. 21 calculates the CRC calculated value of a frame to be transmitted to the second transmission device 3B and adds the SN to the calculated CRC calculated value to calculate the FCS calculated value. The first transmission device 3A stores the calculated FCS calculated value in the FCS byte field in the frame and transmits the signal in which the FCS calculated value is stored to the second transmission device 3B via the active line and the spare line.

The second transmission device 3B calculates the SN of the frame from the FCS calculated value stored in the FCS byte field in the received frame from the sixth relay device 4F. The second transmission device 3B is capable of determining abnormality and normality on consecutiveness of the signals in the received frames from the active line and the spare line on the basis of the SN difference values between the anteroposterior frames.

Figure 22:
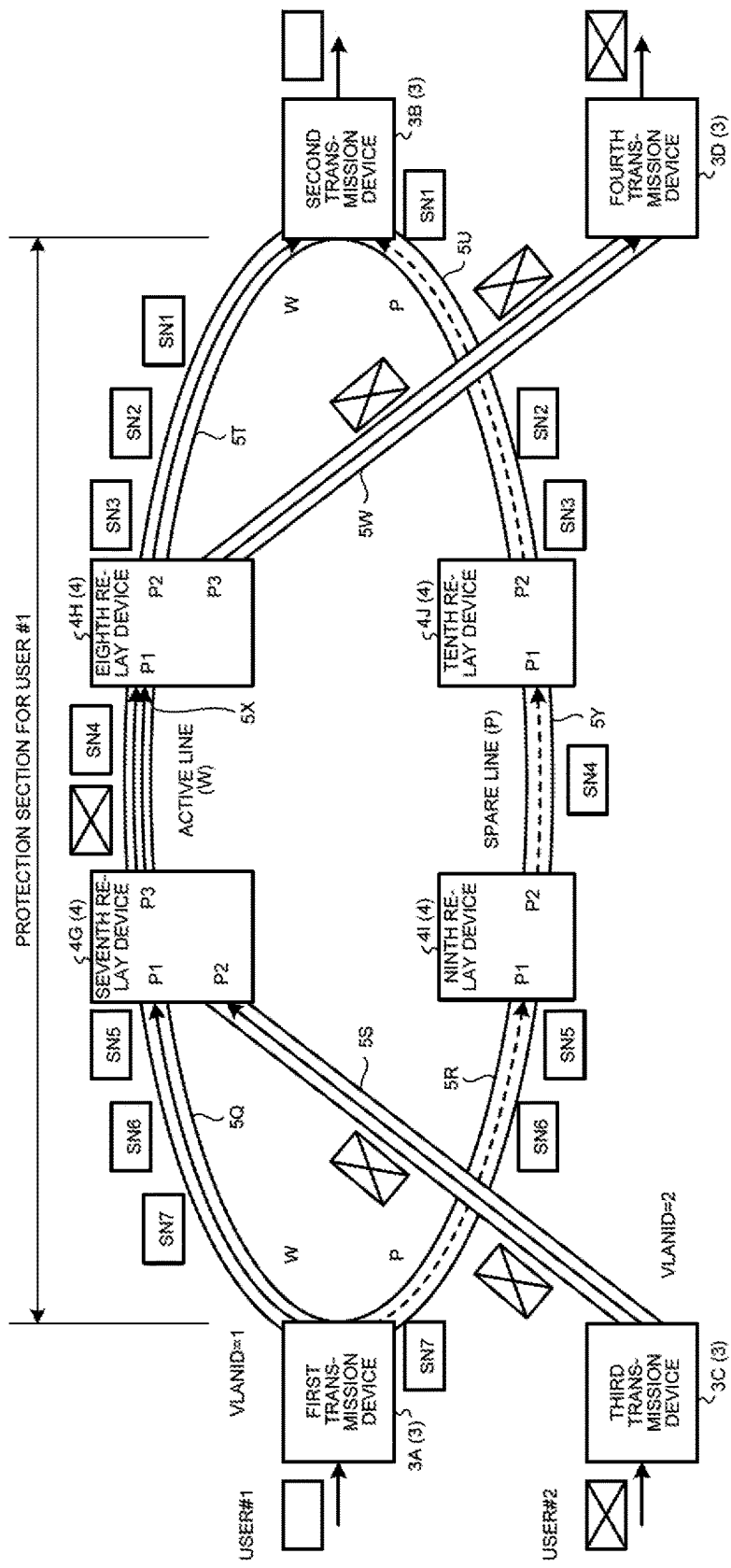
FIG. 22 is an explanatory view illustrating an exemplary ring transmission system.

The embodiment is not limited to the linear transmission system 1A illustrated in FIG. 21 and is applicable to a ring transmission system 1B as illustrated in FIG. 22. FIG. 22 is an explanatory view illustrating an exemplary ring transmission system. The same components as those of the transmission system 1 illustrated in FIG. 1 are denoted by the same reference numerals and the redundant descriptions of the components and operations will be omitted. The transmission system 1B illustrated in FIG. 22 includes, instead of the first to fourth relay devices 4A to 4C, a seventh relay device 4G, an eighth relay device 4H, a ninth relay device 4I, and a tenth relay device 4J.

The first transmission device 3A connects to the seventh relay device 4G via a 21st line 5Q and connects to the ninth relay device 4I via a 22nd line 5R. The third transmission device 3C connects to the seventh relay device 4G via a 23rd line 5S. The second transmission device 3B connects to the eighth relay device 4H via a 24th line 5T and connects to the tenth relay device 4J via a 25th line 5U. The fourth transmission device 3D connects to the eighth relay device 4H via a 26th line 5W. The seventh relay device 4G connects to the eighth relay device 4H via a 27th line 5X. The ninth relay device 4I connects to the tenth relay device 4J via a 28th line 5Y.

The first transmission device 3A is capable of transmitting and outputting the signal where VLAN ID=1 to the second transmission device 3B via the 21st line 5Q, the seventh relay device 4G, the 27th line 5X, the eighth relay device 4H, and the 24th line 5T, each serving as the active line.

The first transmission device 3A is capable of transmitting and outputting the signal where the VLAN ID=1 to the second transmission device 3B via the 22nd line 5R, the ninth relay device 4I, the 28th line 5Y, the tenth relay device 4J, and the 25th line 5U, each serving as the spare line. In short, the first transmission device 3A outputs the signal in which the FCS calculated value is stored to the second transmission device 3B by using the active line and outputs the signal in which the FCS calculated value is stored to the second transmission device 3B by using the spare line.

The third transmission device 3C transmits the signal where the VLAN ID=2 to the fourth transmission device 3D via the 23rd line 5S, the seventh relay device 4G, the 27th line 5X, the eighth relay device 4H, and the 26th line 5W.

The first transmission device 3A in the ring transmission system 1B illustrated in FIG. 22 calculates the CRC calculated value of the frame to be transmitted to the second transmission device 3B and adds the SN to the calculated CRC calculated value to calculate the FCS calculated value. The first transmission device 3A stores the calculated FCS calculated value in the FCS byte field in the frame and transmits the signal in which the FCS calculated value is stored to the second transmission device 3B via the active line and the spare line.

The second transmission device 3B calculates the SNs of the received frame from the FCS calculated values stored in the FCS byte fields in the received frames from the eighth relay device 4H and the tenth relay device 4J. The second transmission device 3B is capable of recognizing the abnormality and normality in signal consecutiveness in the received frames from the active line and the spare line on the basis of the SN difference value between anteroposterior frames.

For the embodiment, for the convenience of descriptions, the transmission system 1 in which a single is transmitted from the first transmission device 3A to the second transmission device 3B has been exemplified. Alternatively, a signal may be transmitted from the second transmission device to the first transmission device or duplex communications may be possible between the first transmission device 3A and the second transmission device 3B.

According to the embodiment, because the FCS calculated value obtained by adding the SN is stored in the FCS byte field, transmission of the SN to the opposing transmission device 3 is enabled by using the existing FCS byte field without causing any frame loss even when the frame density is high.

According to the embodiment, because the opposing transmission device 3 is notified of the SN of the frame without changing the data length of the frame, uninterruptible switching of redundant signals using the SN is enabled.

The first transmission device 3A calculates the CRC value of the frame, stores the FCS calculated value obtained by adding the SN to the calculated CRC value in the FCS byte field in the frame, and transmits the frame in which the FCS calculated value is stored to the second transmission device 3B via the active line and the spare line. This enables the first transmission device 3A to notify the second transmission device 3B of the SN while keeping the band currently used, without changing the signal data length.

Upon receiving a signal from the first transmission device 3A, the second transmission device 3B calculates the CRC value of the received signal and subtracts the CRC value from the FCS calculated value stored in the FCS byte field to extract the SN. The second transmission device 3B determines whether the difference value between the SN of the received current frame and the SN of the previous frame is +1 and, when the difference value is +1, determines that the consecutiveness of the received frames is normal. Furthermore, when the difference value is other than +1, the second transmission device 3B determines that the consecutiveness of received frames is abnormal. This enables the second transmission device 3B to recognize the consecutiveness of received frames by using the SNs in the FCS calculated values stored in the FCE byte fields.

After it is determined that the signal consecutiveness is abnormal, when the SN difference value is +1 and it is determined that the signal consecutiveness is abnormal for, for example, four times continuously, the second transmission device 3B determines that the signal consecutiveness is normal. This enables accurate recognition of normal signal consecutiveness.

When the SN difference value is not +1 for four times continuously, the second transmission device 3B determines that the signal consecutiveness is abnormal. This enables accurate recognition of abnormality in signal consecutiveness.

When it is determined that the consecutiveness of signals from the active line is abnormal and the consecutiveness of signals from the spare line is normal, the second transmission device 3B switches from the signal from the active line to the signal from the spare line. This enables a switch output to switch from the signal from the active line to the signal from the spare line.

On the basis of the phase difference between the signal from the active line and the signal from the spare line that have the same SN, the second transmission device 3B performs a switch output to switch from the signal from the active line to the signal from the spare line. This enables establishment of synchronization when switching the signals from the active line and the spare line, thereby enabling signal switching.

The first transmission device 3A stores the FCS calculated value obtained by adding the SN to the CRC value in the FCS byte field that is the normal field in the frame. As a result, the first transmission device 3A uses the 4-byte field of the existing FCS byte field, which enables notification of the SN to the opposing second transmission device 3B without causing any frame loss.

The first relay device 4A calculates the CRC value of the frame, stores the FCS calculated value obtained by adding the SN to the calculated CRC value in the FCS byte field in the frame, and transmits the frame in which the FCS calculated value is stored to the second relay device 4B via the active line and the spare line. This enables notification of the SN to the opposing second relay device 4B while maintaining the currently used band without changing the signal packet length.

For example, upon receiving a signal from the first relay device 4A, the second relay device 4B calculates the CRC value of the received signal and subtracts the CRC value from the FCS calculated value stored in the FCS byte to extract the SN. The second relay device 4B determines whether the difference value between the SN of the received current frame and the SN of the previous frame is +1 and, when the difference value is +1, determines that the consecutiveness of received frames is normal. Furthermore, when the difference value is other than +1, the second relay device 4B determines that the consecutiveness of received frames is abnormal. This enables the second relay device 4B to recognize the consecutiveness of received frames by using the SNs in the FCS calculated values stored in the FCE bytes.

When the difference value is +1 after it is determined that the signal consecutiveness is abnormal, for example, the second relay device 4B determines that the signal consecutiveness is normal when when it is determined that the SN difference value is +1 for four times continuously. This enables accurate recognition of normal signal consecutiveness.

When the difference value is not +1 for four times continuously, the second relay device 4B determines that the signal consecutiveness is abnormal. This enables accurate recognition of abnormality in signal consecutiveness.

When it is determined that the consecutiveness of signals from the active line is abnormal and the consecutiveness of signals from the spare line is normal, the second relay device 4B switches from the signal from the active line to the signal from the spare line. This enables a switch output to switch from the signal from the active line to the signal from the spare line.

On the basis of the phase difference between the signal from the active line and the signal from the spare line that have the same SN, the second relay device 4B performs a switch output to switch from the signal from the active line to the signal from the spare line. This enables establishment of synchronization when switching between the signal from the active line and the signal from the spare line, thereby enabling a signal switch.

The first relay device 4A stores the FCS calculated value obtained by adding the SN to the CRC value in the FCS byte field that is the normal field in the frame. As a result, the 4-byte field of the existing FCS byte field is used, which enables notification of the SN to the opposing second relay device 4B without causing any frame loss.

The case has been described where one active line and one spare line are used in the transmission system 1 according to the embodiment; however, for example, the invention is applicable to the case where one active line and two spare lines are used. The number of active lines and spare lines may be changed appropriately.

For the embodiment, optical lines are exemplified as lines. Alternatively, electronic lines for transmitting frames of electric signals may be used and, in that case, the transmission device 3 and the relay device 4 incorporate interfaces for connecting to the electronic lines.

Each component of each unit illustrated in the drawings does not necessarily have to be physically configured as illustrated in the drawings. In other words, a specific mode of dispersion and integration of each unit is not limited to that illustrated in the drawings. All or part of the units may be configured by dispersing or integrating them functionally or physically in accordance with various loads or the usage in an arbitrary unit.

The transmission device includes a central processing unit (CPU), a digital signal processor (DSP), and a memory. The memory may be, for example, comprised of a read only memory (ROM) or a random access memory, such as a synchronous dynamic random access memory (SDRAM), a magnetoresistive random access memory (NRAM), or a non-volatile memory (NVRAM). All or arbitrary part of various processing functions implemented in various devices, such as the processing function of a control unit, may be implemented in the CPU or the DSP. Furthermore, all or part or various processing functions may be implemented on the program analyzed and executed in the CPU or the DSP or on the hard-wired logic.

Figure 23:
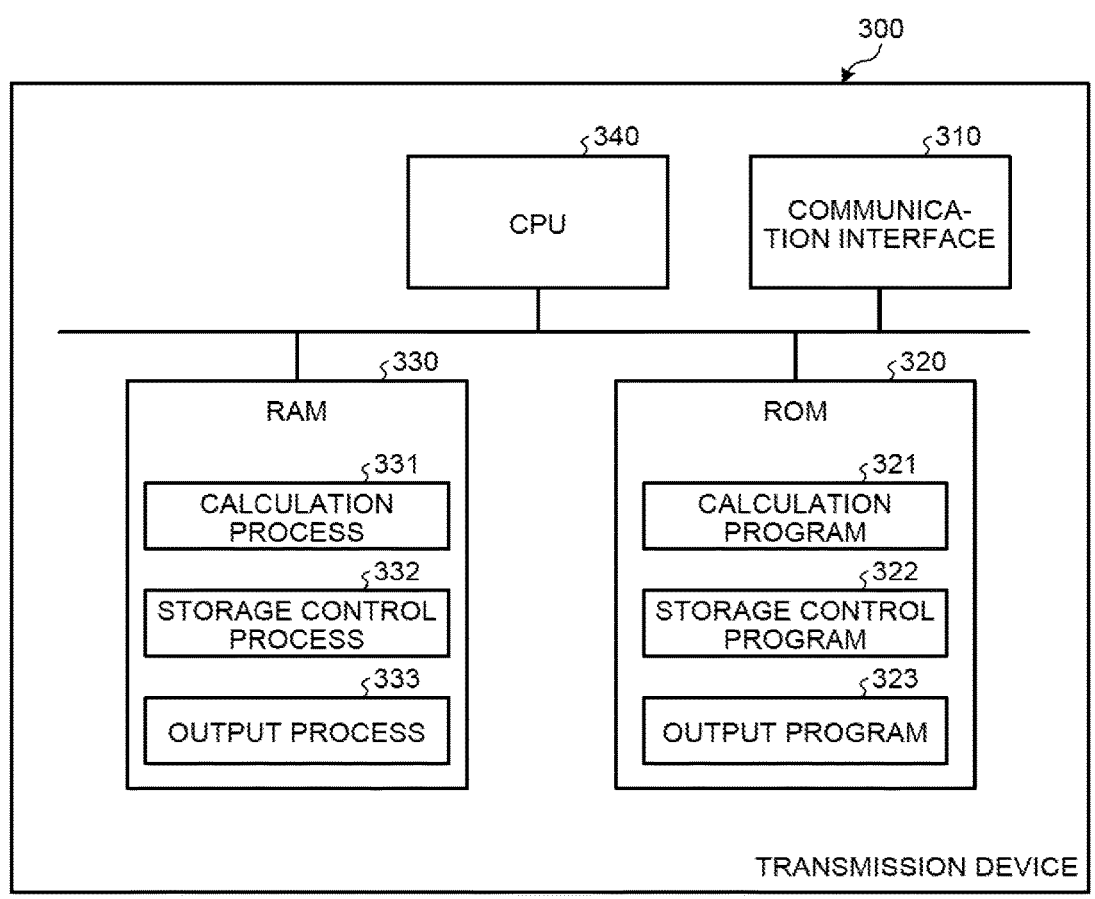
FIG. 23 is an explanatory view illustrating an exemplary transmission device that executes a transmission program.

Various processes according to the embodiment described above may be implemented by executing the prepared program by a processor, such as a CPU in the transmission device. An exemplary transmission device that executes the program having the same function as that of the embodiment will be described below. FIG. 23 is an explanatory view illustrating an exemplary transmission device that executes a transmission program.

A transmission device 300 that executes the transmission program illustrated in FIG. 23 includes a communication interface 310, a ROM 320, a RAM 330, and a CPU 340. The communication interface 310, the ROM 320, the RAM 330, and the CPU 340 are connected via a bus.

In the ROM 320, the transmission program that implements the same functions as those according to the embodiment is stored in advance. The ROM 320 stores a calculation program 321, a storage control program 322, and an output program 323 as the transmission program. The transmission program may be recorded not in the ROM 320 but in a recording medium that is computer-readable with a drive (not illustrated). The recording medium may be a portable recording medium, such as a CD-ROM, a DVD disk, or a USB memory, or a semiconductor memory, such as a flash memory.

The CPU 340 reads the calculation program 321 from the ROM 320 and functions as a calculation process 331 in the RAM 330. Furthermore, the CPU 340 reads the storage control program 322 from the ROM 320 and functions as a storage control process 332 in the RAM 330. Furthermore, the CPU 340 reads the output program 323 from the ROM 320 and functions as an output process 333 in the RAM 330. The communication interface 310 includes a plurality of ports to be connected to other transmission devices by using active and spare lines (not illustrated).

The CPU 340 calculates an error code value of a signal via the communication interface 310. The CPU 340 identifies the signal per signal and stores, in a predetermined area in the signal, the calculated value obtained by adding the sequential number representing the consecutiveness of the signal to the error code value. With the active and spare lines, the CPU 340 outputs the signal in which the calculated value is stored to the opposing device. This enables notification of the sequential number to the opposing device without changing the byte length.

According to one aspect, there is an effect that it is possible to notify an opposing device of a sequential number.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transmission device that transmits a signal to an opposing device by using an active line and a spare line, the transmission device comprising a processor configured to:
    calculate an error code value of the signal;
    identify the signal and store, in a predetermined field in the signal, a calculated value obtained by adding a sequential number that represents consecutiveness of the signal to the error code value;
    output the signal in which the calculated value is stored to the opposing device by using the active line and the spare line; and
    calculate, when the signal is received from the opposing device by using the active line and the spare line, the error code value of the received signal and subtract the calculated error code value of the received signal from the calculated value in the signal to extract the sequential number.

2. The transmission device according to claim 1, wherein the processor is further configured to:
- extract the sequential number from the calculated value in the signal when the signal is received from the opposing device by using the active line and the spare line;
- determine whether a difference value between the sequential numbers extracted respectively from anteroposterior signals sequentially received from the opposing device is a predetermined value; and
- determine that the consecutiveness of the signal is normal when the difference value is the predetermined value and that the consecutiveness of the signal is abnormal when the difference value is not the predetermined value.

3. The transmission device according to claim 2, wherein the processor is configured to, after determining that the consecutiveness of the signal is abnormal, determine that the consecutiveness of the signal is normal when determining that the difference value is the predetermined value for a predetermined number of times continuously.

4. The transmission device according to claim 3, wherein the processor is configured to, after determining that the consecutiveness of the signal is abnormal, determine that the consecutiveness of the signal is abnormal when it is determined that the difference value is not the predetermined value before it is determined that the difference value is the predetermined value for the predetermined number of times continuously.

5. The transmission device according to claim 1, wherein the processor is further configured to switch from the signal from the active line to the signal from the spare line when it is determined that the consecutiveness of the signal from the active line is abnormal and the consecutiveness of the signal from the spare line is normal.

6. The transmission device according to claim 5, wherein the processor is configured to, when switching from the signal from the active line to the signal from the spare line, control the timing at which a switch output is performed to switch from the signal from the active line to the signal from the spare line on the basis of the phase difference between the signal from the active line and the signal from the spare line that relates to the same sequential number.

7. The transmission device according to claim 1, wherein the calculated value has the same byte length as that of the error code value.

8. A transmission system that includes a first transmission device and a second transmission device and that transmits a signal from the first transmission device to the second transmission device by using an active line and a spare line, the first transmission device comprising a first processor configured to:
- calculate an error code value of the signal;
- identify the signal and store, in a predetermined field in the signal, a calculated value obtained by adding a sequential number that represents consecutiveness of the signal to the error code value;
- output the signal in which the calculated value is stored to the second transmission device by using the active line and the spare line, and the second transmission device comprising a second processor configured to:
- calculate, when the signal is received from the first transmission device by using the active line and the spare line, the error code value of the received signal and subtract the calculated error code value from the calculated value in the signal to extract the sequential number;
- determine whether a difference value between the sequential numbers extracted respectively from anteroposterior signals sequentially received from the first device is a predetermined value; and
- determine that the consecutiveness of the signal is normal when the difference value is the predetermined value and that the consecutiveness of the signal is abnormal when the difference value is not the predetermined value.

9. A transmission method performed by a transmission device that transmits a signal to an opposing device by using an active line and a spare line, the transmission method comprising:
- calculating, by a processor of the transmission device, an error code value of the signal;
- identifying, by the processor, the signal and storing, in a predetermined field in the signal, a calculated value obtained by adding a sequential number that represents the consecutiveness of the signal to the error code value;
- outputting, by the processor, the signal in which the calculated value is stored to the opposing device by using the active line and the spare line; and
- calculating, when the signal is received from the opposing device by using the active line and the spare line, the error code value of the received signal, by the processor, and subtracting the calculated error code value of the received signal from the calculated value in the signal to extract the sequential number.

* * * * *